United States Patent
Ng et al.

(10) Patent No.: US 10,433,269 B2
(45) Date of Patent: Oct. 1, 2019

(54) METHOD AND SYSTEM FOR INTEGRATED BACKHAUL AND WIRELESS ACCESS NETWORK

(71) Applicant: Samsung Electronics Co., Ltd., Suwon-si (KR)

(72) Inventors: Boon Loong Ng, Plano, TX (US); Young-Han Nam, Plano, TX (US); Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/785,149

(22) Filed: Oct. 16, 2017

(65) Prior Publication Data
US 2018/0124718 A1    May 3, 2018

Related U.S. Application Data

(60) Provisional application No. 62/416,439, filed on Nov. 2, 2016, provisional application No. 62/464,079, filed
(Continued)

(51) Int. Cl.
*H04W 56/00* (2009.01)
*H04B 7/15* (2006.01)
(Continued)

(52) U.S. Cl.
CPC ............ *H04W 56/001* (2013.01); *H04B 7/15* (2013.01); *H04L 5/0007* (2013.01); *H04W 88/08* (2013.01)

(58) Field of Classification Search
CPC ...... H04B 7/15; H04L 5/0007; H04W 56/001; H04W 88/08
See application file for complete search history.

(56) References Cited

U.S. PATENT DOCUMENTS

2009/0042532 A1* 2/2009 Bienas ................. H04W 24/00
                                                                 455/403
2014/0010131 A1   1/2014 Gaal et al.
(Continued)

FOREIGN PATENT DOCUMENTS

WO    2015/115974 A1    8/2015
WO    2015/148815 A1   10/2015

OTHER PUBLICATIONS

"ETSI Technical Specification; LTE; Evolved Universal Terrestrial Radio Access (E-UTRA); Physical Channels and Modulation, (3GPP TS 36.211 Version 12.3.0 Release 12)," ETSI TS 136 211, V12.3.0, Oct. 2014, 126 pages.
(Continued)

*Primary Examiner* — Brian D Nguyen

(57) ABSTRACT

The present disclosure includes systems and methods for an integrated wireless backhaul and access network. A relay node (RN) comprises a transceiver configured to receive, from a second node, which may be an anchor base station (ABS) or a second RN, a synchronization signal burst comprising a plurality of synchronization signal blocks, each of the plurality of synchronization signal blocks transmitted using a set of channel resources. The RN further comprises a processor operably connected to the transceiver, the processor configured to measure the received plurality of synchronization signal blocks and to identify, based at least in part on the measurement of the plurality of synchronization signal blocks, at least one of the plurality of synchronization signal blocks to monitor as a synchronization reference for the second node.

19 Claims, 21 Drawing Sheets

Related U.S. Application Data on Feb. 27, 2017, provisional application No. 62/476,113, filed on Mar. 24, 2017, provisional application No. 62/512,589, filed on May 30, 2017.

(51) Int. Cl.
*H04L 5/00* (2006.01)
*H04W 88/08* (2009.01)

(56) References Cited

U.S. PATENT DOCUMENTS

| | | | |
|---|---|---|---|
| 2014/0334399 A1 | 11/2014 | Xu et al. | |
| 2015/0085833 A1* | 3/2015 | Han | H04J 11/0069 370/336 |
| 2015/0189574 A1* | 7/2015 | Ng | H04W 24/08 370/252 |
| 2015/0215879 A1 | 7/2015 | Zhu et al. | |
| 2018/0049259 A1* | 2/2018 | Aminaka | H04W 72/048 |
| 2018/0109345 A1* | 4/2018 | Svedman | H04J 11/0079 |

OTHER PUBLICATIONS

"ETSI Technical Specification; LTE; Evolved Universal Terrestrial Radio Access (E-UTRA); Multiplexing and Channel Coding, (3GPP TS 36.212 Version 12.2.0 Release 12)," ETSI TS 136 212, V12.2.0, Oct. 2014, 91 pages.

"ETSI Technical Specification; LTE; Evolved Universal Terrestrial Radio Access (E-UTRA); Physical Layer Procedures, (3GPP TS 36.213 Version 12.3.0 Release 12)," ETSI TS 136 213, V12.3.0, Oct. 2014, 214 pages.

"ETSI Technical Specification; Universal Mobile Telecommunications System (UMTS); LTE; Evolved Universal Terrestrial Radio Access (E-UTRA); Physical Layer for Relaying Operation, (3GPP TS 36.216 Version 12.0.0 Release 12)," ETSI TS 136 216, V12.0.0, Oct. 2014, 18 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)," 3GPP TS 36.300, V13.0.0, Jun. 2015, 254 pages.

"ETSI Technical Specification; LTE; Evolved Universal Terrestrial Radio Access (E-UTRA); Radio Resource Control (RRC); Protocol Specification, (3GPP TS 36.331 Version 12.3.0 Release 12)," ETSI TS 136 331, V12.3.0, Sep. 2014, 383 pages.

International Search Report dated Feb. 5, 2018 in connection with International Patent Application No. PCT/KR2017/012335.

Written Opinion of the International Searching Authority dated Feb. 5, 2018 in connection with International Patent Application No. PCT/KR2017/012335.

* cited by examiner

METHOD AND SYSTEM FOR INTEGRATED BACKHAUL AND WIRELESS ACCESS NETWORK

CROSS-REFERENCE TO RELATED APPLICATION AND CLAIM OF PRIORITY

This application claims priority under 35 U.S.C. § 119(e) to U.S. Provisional Patent Application No. 62/416,439 filed on Nov. 2, 2016, and to U.S. Provisional Patent Application No. 62/464,079 filed on Feb. 27, 2017, and to U.S. Provisional Patent Application No. 62/476,113 filed on Mar. 24, 2017, and to U.S. Provisional Patent Application No. 62/512,589 filed on May 30, 2017. The above-identified provisional patent applications are hereby incorporated by reference in their entirety.

TECHNICAL FIELD

This disclosure relates generally to wireless communication systems. More specifically, this disclosure relates to a method and system for an integrated wireless backhaul and access network.

BACKGROUND

A communication system includes a downlink (DL) that conveys signals from transmission points such as base stations (BSs) or eNodeBs (eNBs) to user equipments (UEs) and an uplink (UL) that conveys signals from UEs to reception points such as eNBs. A UE, also commonly referred to as a terminal or a mobile station, may be fixed or mobile and may be a cellular phone, a personal computer device, or the like. An eNB, which is generally a fixed station, may also be referred to as an access point.

SUMMARY

This disclosure provides a method and system for an integrated wireless backhaul and access network.

In a first embodiment, a relay node (RN) includes a transceiver configured to receive, from an anchor base station (ABS), a synchronization signal burst comprising a plurality of synchronization signal blocks, each of the plurality of synchronization signal blocks transmitted using a set of channel resources. The RN further includes a processor operably connected to the transceiver, the processor configured to measure the received plurality of synchronization signal blocks, and identify, based at least in part on the measurement of the plurality of synchronization signal blocks, at least one of the plurality of synchronization signal blocks to monitor as a synchronization reference for the ABS.

In a second embodiment, an anchor base station (ABS) includes a processor and a transceiver operably connected to the processor, the transceiver configured to transmit, to a relay node (RN), a synchronization signal burst comprising a plurality of synchronization signal blocks. Each of the plurality of synchronization signal blocks is transmitted using a set of channel resources, such that the RN is able to identify at least one of the plurality of synchronization signal blocks to monitor as a synchronization reference for the ABS.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
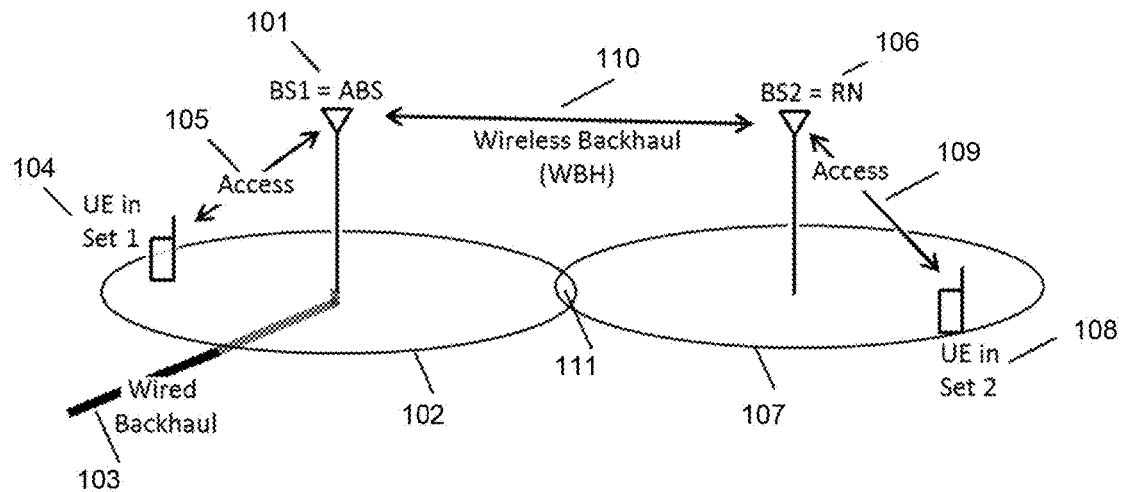
FIG. 1 illustrates an example cellular system according to this disclosure.

FIGS. 1 through 21, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

A wireless communication system generally includes a downlink (DL) that conveys signals from transmission points such as base stations (BSs) to user equipments (UEs) and an uplink (UL) that conveys signals from UEs to reception points such as BSs. Depending on the network type, the term "base station" or "BS" can refer to any component (or collection of components) configured to provide wireless access to a network, such as transmit point (TP), transmit-receive point (TRP), an enhanced base station (eNodeB or eNB or gNB) , a macrocell, a femtocell, a Wi-Fi access point (AP), or other wirelessly enabled devices. Base stations may provide wireless access in accordance with one or more wireless communication protocols, e.g., 5G 3GPP New Radio Interface/Access (NR), long term evolution (LTE) , LTE advanced (LTE-A), High Speed Packet Access (HSPA), Wi-Fi 802.11a/b/g/n/ac, etc. For the sake of convenience, the terms "BS" and "TRP" are used interchangeably in this disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

In Next Generation (NG) wireless systems, "relaying" may be supported by having a Relay Node (RN) or Relay Base Station (BS) wirelessly connect to a Next Generation NB (gNB) serving the RN. Such a gNB is called a donor BS, or anchor base station (ABS). In certain network architectures, the ABS and the RN are different gNBs FIG. 1 illustrates an example cellular system according to embodiments of the present disclosure. BS1 101 provides wireless access to UEs located in a geographical coverage area 102. The set of UEs served by BS1 101 is referred to as UE Set 1. An example UE that is a member of UE Set 1, i.e., that is served by BS1 101, is identified as UE 104. BS1 101 transmits information to, and receives information from, UE Set 1 via the wireless access link 105. The BS-to-UE transmission direction is referred to as the downlink (DL) of the wireless access link 105. The UE-to-BS transmission direction is referred to as the uplink (UL) of the wireless access link 105. The DL information that is intended for a particular UE in UE Set 1 arrives at BS1 101 via the wired backhaul 103 from the source of the information. As an example, the wired backhaul could comprise an optical fiber connecting BS1 to the infrastructure of an internet service provider (ISP), and thenceforth to the internet, with a website being accessed by the UE being the source of the information. The UL information transmitted by a particular UE to BS1 101 is transferred to the destination of the information via the wired backhaul 103. As in the previous example, a website on the internet being accessed by the UE may be the destination of the information.

The cellular system illustrated in FIG. 1 also includes a BS2 106 that provides wireless access to UEs located in a geographical coverage area 107. As indicated by area 111, the coverage areas 102 and 107 of BS1 101 and BS2 106 may overlap. The set of UEs served by BS2 106 is referred to as UE Set 2. An example UE that is a member of UE Set 2, i.e., that is served by BS2 106, is identified as UE 108. BS2 106 transmits information to, and receives information from, UE Set 2 via the wireless access link 109. The definitions of the DL and UL transmission directions with respect to wireless access link 109 are the same as with respect to the wireless access link 105.

Unlike BS1 101, BS2 106 does not have a wired backhaul. Instead, BS1 101 provides backhaul services to BS2 106, analogous to those provided to BS1 101 by the wired backhaul link 103, via the wireless backhaul link (WBH) 110. DL information that is intended for a particular UE 108 in UE Set 2 arrives at BS1 101 via the wired backhaul 103 from the source of the information, and is then transferred by BS1 101 to BS2 106 via the WBH link 110. Similarly, the UL information transmitted by a particular UE 108 in UE Set 2 to BS2 106 is transferred by BS2 106 to BS1 101 via the WBH link 110, and is subsequently transferred to the destination of the information via the wired backhaul 103 by BS1 101. The source and the destination of the information to and from a UE 108 in UE Set 2, respectively, are analogous to the above description with respect to the source and destination of the information to and from a UE 104 in UE Set 1, respectively.

Since BS1 101 relays the information to and from UE Set 2 served by BS2 106 via the WBH 110, BS2 106 may be known as a relay node (RN) with respect to BS1 101, as described above. BS1 101 may be known as an anchor base station (ABS) or anchor node to BS2/RN 106, as described above, due to providing backhaul services for the BS2 106. The BS1 101 may alternatively be known as a donor base station or donor node. Accordingly, BS1 101 will be referred to below as ABS 101, and BS2 106 will be referred to below as RN 106.

FIG. 1 illustrates a single-hop wireless relay network but the disclosure is also extended to multi-hop wireless relay networks. In a multi-hop wireless relay network, a second RN may relay signals between an ABS such as ABS 101 and an RN such as RN 106. The second RN may perform the functions of the ABS 101 from the perspective of the RN 106. Furthermore, in a multi-hop wireless relay network, a second RN may relay signals between an RN such as RN 106 and a UE such as UE 108.

In one embodiment, the WBH 110 and the wireless access links 105 and 109 share same channel resources (e.g., a same frequency band). In another embodiment, the WBH 110 and the wireless access links 105 and 109 operate on different channel resources (e.g., different frequency bands); for example the WBH 110 may be on the 60 GHz band while the wireless access links 105 and 109 are on the 28 GHz band. In yet another embodiment, the wireless access links 105 and 109 are operated with a different radio access technology than that of the WBH 110; for example, the WBH 110 may be based on 3GPP New Radio technology, while the wireless access links 105 and 109 are based on Wi-Fi or LTE technologies. Unless specified otherwise, it is assumed the WBH 110 and the wireless access links 105 and 109 share the same frequency band.

It is understood that the cellular system, an example of which is depicted in FIG. 1, may include several ABSs and several RNs, each with a coverage region serving a certain UE set, with each RN being anchored by a subset of the ABSs. The communications between each ABS and RN with the set of UEs served by it, respectively, are as described in the context of FIG. 1. Similarly, the communications between each ABS and an RN anchored by it are as described in the context of FIG. 1. Such a cellular system will be referred to in this disclosure as a unified, or integrated, wireless backhaul and access system.

Embodiments of the present disclosure consider that when multiple wireless links share channel resources, coordination of transmissions is beneficial to avoid interference. When coordinating channel resources, the data capacity of a given wireless link may be reduced due to coordinated downtime during which some devices refrain from using the channel resources so that another set of devices may use those channel resources. For example, time multiplexing may be used to coordinate transmissions by time slots or subframes between devices. Similarly, frequency resources may be multiplexed among devices within a given time slot to allow multiple devices to send transmissions simultaneously without interfering with each other. In some cases, resource reuse is possible in a system, meaning that different devices may simultaneously transmit or receive information using the same frequency resources. This may be possible when interference between the devices is sufficiently small, for example when overlap of transmission coverage areas of the devices is sufficiently small. However, the application of resource reuse is limited in dense wireless cell deployment scenarios. Accordingly, in a relay system, it may be beneficial to intelligently schedule transmissions to share channel resources when overlapping transmissions using the same resources present little danger of interference. For example, during initial access and synchronization between ABSs, RNs, and UEs, as will be described below.

Figure 2:
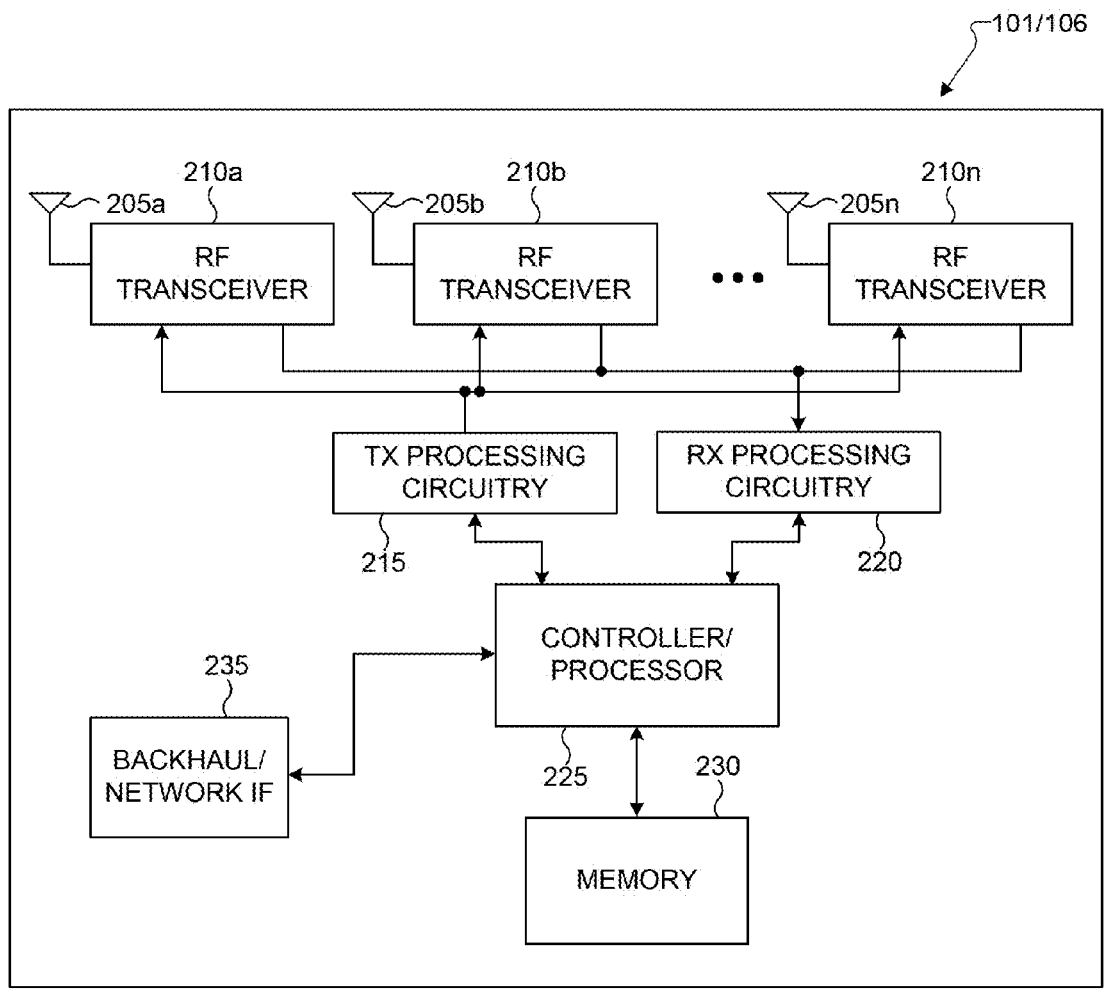
FIG. 2 illustrates an example anchor base station or relay node according to this disclosure.

FIG. 2 illustrates an example ABS 101 or RN 106 according to this disclosure. The embodiment of the ABS 101 or RN 106 shown in FIG. 2 is for illustration only, and other BSs of FIG. 1 could have the same or similar configuration. However, BSs come in a wide variety of configurations, and FIG. 2 does not limit the scope of this disclosure to any particular implementation of a BS. For simplicity, FIG. 2 will be described in the context of ABS 101.

As shown in FIG. 2, the ABS 101 includes multiple antennas 205a -205n, multiple RF transceivers 210a-210n, transmit (TX) processing circuitry 215, and receive (RX) processing circuitry 220. In certain embodiments, one or more of the multiple antennas 205a-205n include 2D antenna arrays. The BS1 101 also includes a controller/processor 225, a memory 230, and a backhaul or network interface 235.

The RF transceivers 210a-210n receive, from the antennas 205a-205n, incoming RF signals, such as signals transmitted by UEs or other BSs. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a -210n receive the outgoing processed baseband or IF signals from the TX processing circuitry 215 and up-convert the baseband or IF signals to RF signals that are transmitted via the antennas 205a -205n.

The controller/processor 225 can include one or more processors or other processing devices that control the overall operation of the BS1 101. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 can perform a frame timing coordination process, a synchronization signal (SS) block monitoring process, a resource protection process, or a dynamic interference mitigation process, as further described below. Any of a wide variety of other functions could be supported in the BS1 101 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 is also capable of supporting channel quality measurement and reporting. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the ABS 101 to communicate with other devices or systems over a backhaul connection or over a network. The interface 235 could support communications over any suitable wired or wireless connection(s). For example, when the BS1 101 is implemented as part of a cellular communication system such as the system of FIG. 1 (which may support 5G, LTE, or LTE-A), the interface 235 could allow the ABS 101 to communicate with other BSs over a wireless connection. For example, when the ABS 101 is implemented as an anchor base station, the interface 235 could allow the ABS 101 to communicate with RNs such as RN 106 over a wireless backhaul connection such as WBH 110. The ABS 101 could also communicate over a wired or wireless local area network or over a wired or wireless connection to a larger network (such as the Internet), for example using wired backhaul 103. Similarly, when RN 106 using the structure of FIG. 2 is operating as an RN, the interface 235 could allow the RN 106 to communicate with ABSs such as ABS 101, or other RNs (in a multi-hop network), over the WBH 110. The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a frame timing coordination algorithm, a synchronization signal (SS) block monitoring algorithm, a resource protection algorithm, or a dynamic interference mitigation algorithm are stored in memory. The plurality of instructions are configured to cause the controller/processor 225 to perform the frame timing coordination process, the synchronization signal (SS) block monitoring process, a resource protection process, or a dynamic interference mitigation process.

The transmit and receive paths of the ABS 101 (implemented using the RF transceivers 210a-210n, TX processing circuitry 215, and/or RX processing circuitry 220) support communication with aggregation of frequency division duplexing (FDD) cells and time division duplexing (TDD) cells.

Although FIG. 2 illustrates one example of an ABS 101 or RN 106, various changes can be made to FIG. 2. For example, the ABS 101 or RN 106 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the ABS 101 could include multiple instances of each (such as one per RF transceiver).

Figure 3:
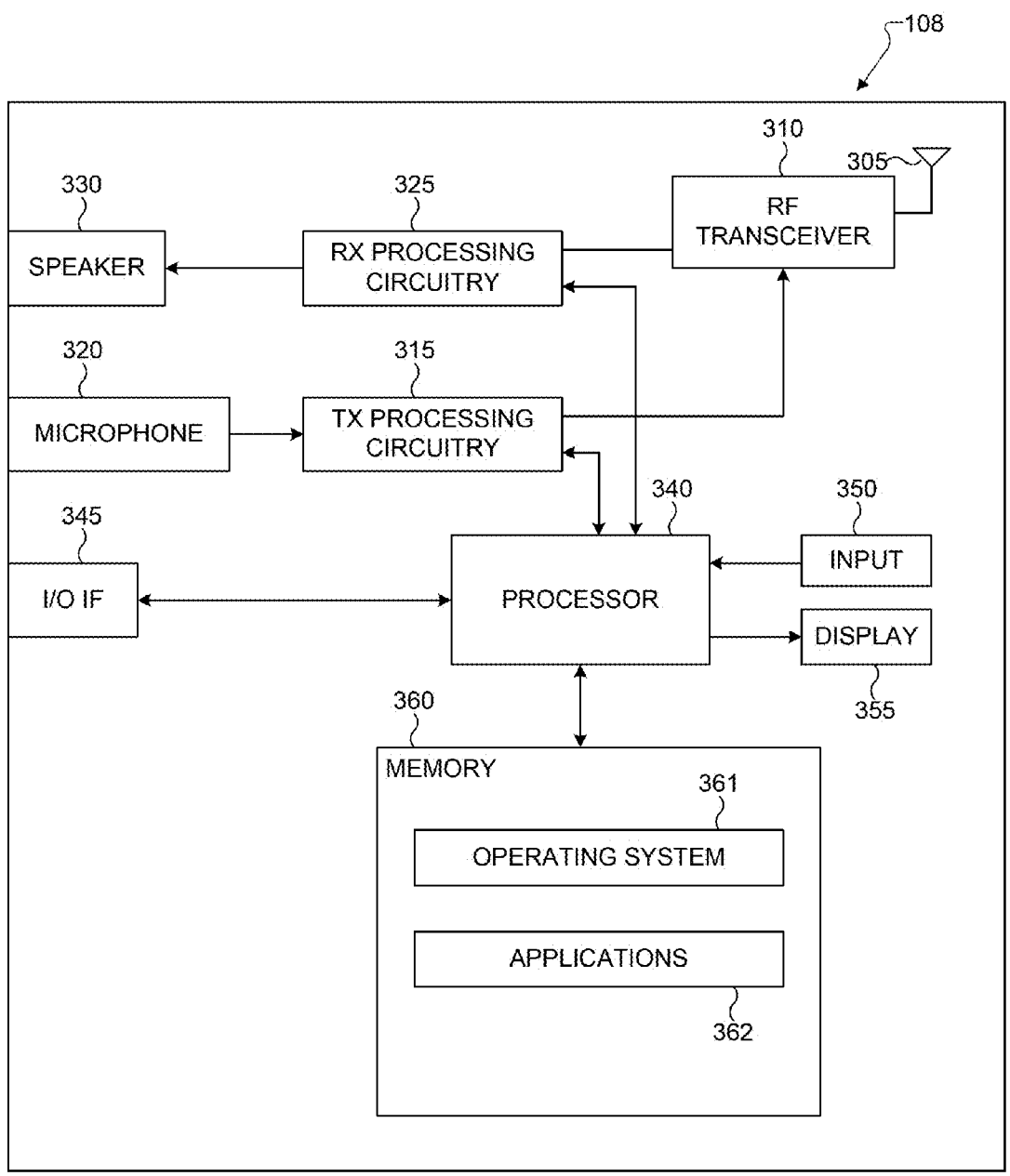
FIG. 3 illustrates an example embodiment of a user equipment according to this disclosure.

FIG. 3 illustrates an example embodiment of a UE 108 according to this disclosure. The UE 104 of FIG. 1 could have the same or similar configuration. Note, however, that UEs come in a wide variety of configurations and that FIG. 3 does not limit this disclosure to any particular implementation of a UE.

As shown in FIG. 3, the UE 108 includes an antenna 305, radio frequency (RF) transceiver 310, transmit (TX) processing circuitry 315, microphone 320, and receive (RX) processing circuitry 325. The UE 108 also includes a speaker 330, processor 340, input/output (I/O) interface (IF) 345, input 350, display 355, and memory 360. The memory 360 includes an operating system (OS) program 361 and a plurality of applications 362.

The RF transceiver 310 receives, from the antenna 305, an incoming RF signal transmitted by a BS, such as BS2 106, of a wireless network, such as the network of FIG. 1. The RF transceiver 310 down-converts the incoming RF signal to produce an intermediate frequency (IF) or a baseband signal. The IF or baseband signal is sent to the RX processing circuitry 325, which produces a processed baseband signal by filtering, decoding, and/or digitizing the baseband or IF signal. The RX processing circuitry 325 transmits the processed baseband signal to the speaker 330 (such as voice data) or to the processor 340 for further processing (such as web browsing).

The TX processing circuitry 315 receives analog or digital voice data from the microphone 320 or other outgoing baseband data (such as web data, e-mail, interactive video game data) from the processor 340. The TX processing circuitry 315 encodes, multiplexes, and/or digitizes the outgoing baseband data to produce a processed baseband or IF signal. The RF transceiver 310 receives the outgoing processed baseband or IF signal from the TX processing circuitry 315 and up-converts the baseband or IF signal to an RF signal that is transmitted via the antenna 305.

In some embodiments, the processor 340 is a microprocessor or microcontroller. The memory 360 is coupled to the processor 340. Part of the memory 360 could include a random access memory (RAM), and another part of the memory 360 could include a Flash memory or other read-only memory (ROM).

The processor 340 can include one or more processors and execute the OS program 361 stored in the memory 360 in order to control the overall operation of the UE 108. In one such operation, the processor 340 controls the reception of forward channel signals and the transmission of reverse channel signals by the RF transceiver 310, the RX processing circuitry 325, and the TX processing circuitry 315 in accordance with well-known principles. The processor 340 can also include processing circuitry configured to allocate one or more resources. For example, the processor 340 can include allocator processing circuitry configured to allocate a unique carrier indicator and detector processing circuitry configured to detect a physical downlink control channel scheduling a physical downlink shared channel reception of a physical uplink shared channel transmission in one of the carriers. The processor 340 may further include detector processing circuitry for detecting synchronization signals, such as by detecting at least one synchronization signal block of a synchronization signal burst of a BS that the UE is linked to. Downlink Control Information (DCI) serves several purposes and is conveyed through DCI formats in respective physical downlink control channels (PDCCHs). For example, a DCI format can correspond to a downlink assignment for physical downlink shared channel (PDSCH) receptions or to an uplink grant for physical uplink shared channel (PUSCH) transmissions. The DCI may also be used to adjust a transmission format of the UE dynamically, as further described below.

The processor 340 is also capable of executing other processes and programs resident in the memory 360, and can move data into or out of the memory 360 as required by an executing process. In some embodiments, the processor 340 is configured to execute a plurality of applications 362, such as applications for MU-MIMO communications, including obtaining control channel elements of PDCCHs. The processor 340 can operate the plurality of applications 362 based on the OS program 361 or in response to a signal received from an eNB. The processor 340 is also coupled to the I/O interface 345, which provides UE 108 with the ability to connect to other devices such as laptop computers and handheld computers. The I/O interface 345 is the communication path between these accessories and the processor 340.

The processor 340 is also coupled to the input 350 and the display 355. The operator of the UE 108 can use the input 350 to enter data into the UE 108. The display 355 can be a liquid crystal display or other display capable of rendering text and/or at least limited graphics, such as from web sites.

Although FIG. 3 illustrates one example of UE 108, various changes can be made to FIG. 3. For example, various components in FIG. 3 could be combined, further subdivided, or omitted and additional components could be added according to particular needs. Also, while FIG. 3 illustrates the UE 108 operating as a mobile telephone, UEs could be configured to operate as other types of mobile or stationary devices.

Figure 4:
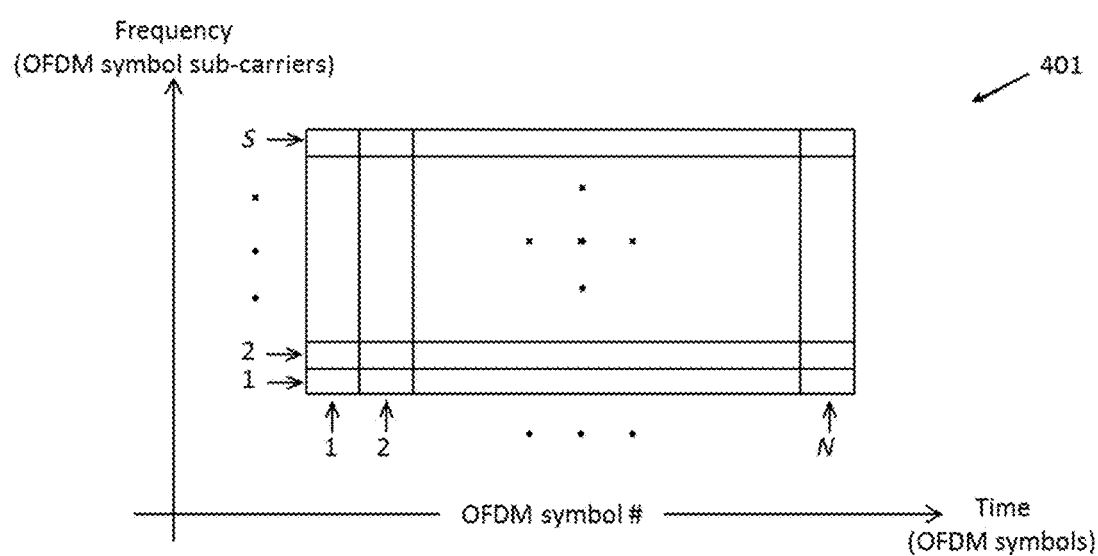
FIG. 4 illustrates an example sub-frame according to this disclosure.

FIG. 4 illustrates an example slot according to this disclosure. In this figure, the horizontal dimension represents time and the vertical dimension represents frequency. FIG. 4 illustrates a slot 401 includes a time-frequency grid comprising a number N OFDM symbols in time, numbered from 1 to N, and a number S sub-carriers in the frequency domain, numbered from 1 to S. That is, slot 401 includes N OFDM symbols sequentially arranged in time, where each OFDM symbol includes S sub-carriers(SCs) in the frequency domain.

In the context of FIG. 1, with respect to ABS 101, transmissions to and from UEs 104 in UE Set 1 are in time units of slots. A certain set of OFDM symbols in a slot may be utilized for DL transmissions from ABS BS1 101 to a UE 104 in UE Set 1, whereas a certain other set of OFDM symbols in the slot may be utilized for UL transmissions from UEs in UE Set 1 to ABS 101. Analogous descriptions apply to RN 106 with respect to transmissions to and from UEs 108 in UE Set 2. Embodiments of this disclosure operate in millimeter wave (mmWave) frequency bands, but the principles may be extended to lower frequency bands. DL signals include data signals conveying information content, control signals conveying DCI, and reference signals (RS), which are also known as pilot signals. An gNB transmits data information or DCI through respective physical DL shared channels (PDSCHs) or physical DL control channels (PDCCHs). A UE can be configured with a transmission mode which determines the downlink unicast reception method for the UE. A gNB transmits one or more of multiple types of RS including a primary synchronization signal (PSS), a secondary synchronization signal (SSS), a tracking RS (TRS), a channel state information RS (CSI-RS), and a demodulation RS (DMRS).

Embodiments of this disclosure recognize that an ABS or a RN may need to be detected by another RN or a UE within coverage range. This is true when they are operating in the same set or an overlapping set of frequency bands. In order for a RN or a UE to perform initial access, it detects signals for initial access that include synchronization signals (e.g. PSS, SSS) and system information that is transmitted in one or more physical broadcast channels such as a 5G New Radio Physical Broadcast Channel (NR PBCH). It is beneficial for aligning the initial access signals of the ABS and the RN so that the UE can detect the signals of different nodes in an efficient manner.

In embodiments of the present disclosure, the RNs and ABSs use synchronization signal bursts (SS bursts) in order to transmit (or "sweep") an SS across available frequency and spatial resources in a given set of time resources. In this way, any devices (such as UEs 104 or 108) desiring to initiate connection with the ABS or RN will be able to successfully receive the information contained in the SS bursts, which allows them to synchronize with the ABS or RN. Similarly, RNs may use the information contained in SS bursts from an ABS to initiate connection with and synchronize with the ABS.

Figure 5:
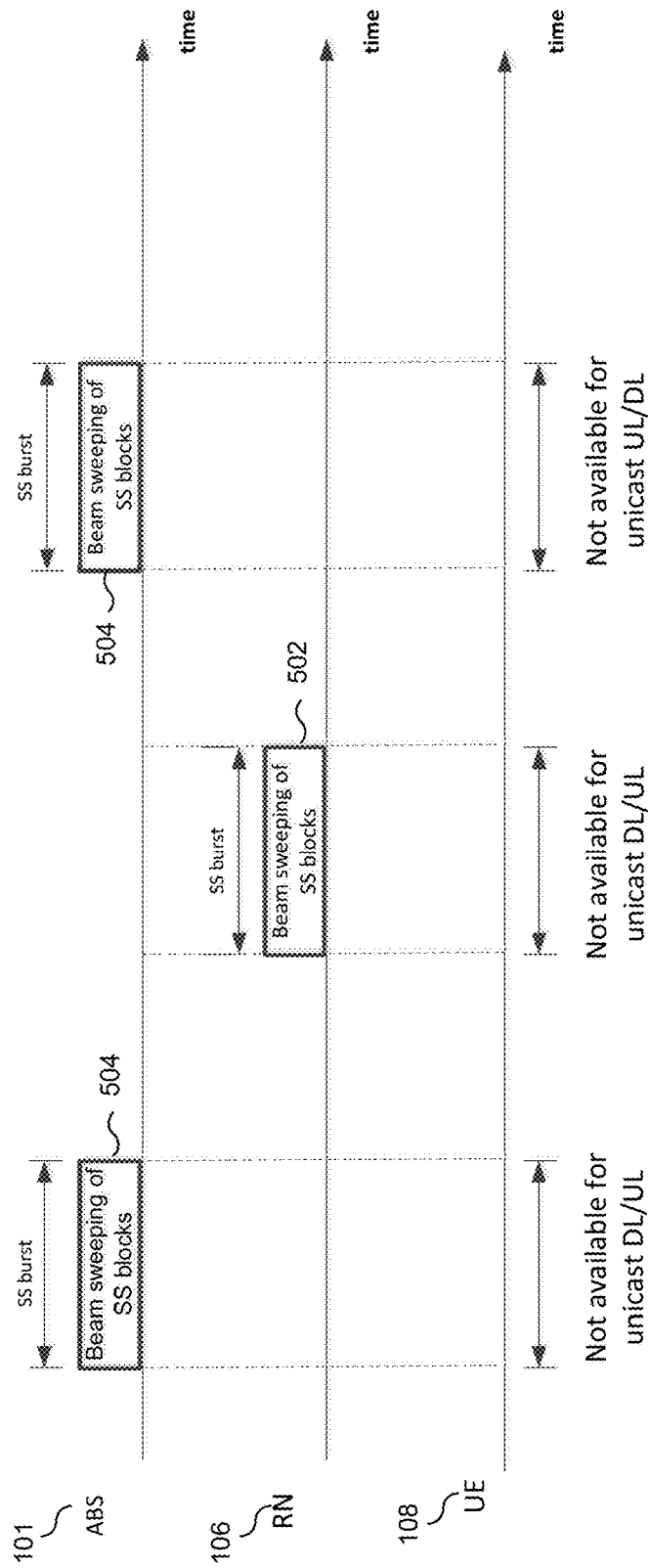
FIG. 5 illustrates an example timing diagram of mis-aligned synchronization signal (SS) bursts according to this disclosure.

FIG. 5 illustrates an example timing diagram of misaligned synchronization signal (SS) bursts according to this disclosure. SS burst 502 transmitted by an RN, such as BS2 106, uses completely different channel resources than the SS bursts 504 transmitted by the ABS, such as BS1 101. Accordingly, the RN and the UE are unable to use channel resources occupied by either SS burst 502 or SS bursts 504 for data transmissions, such as DL (PDSCH) or UL (PUSCH) transmissions.

Figure 6:
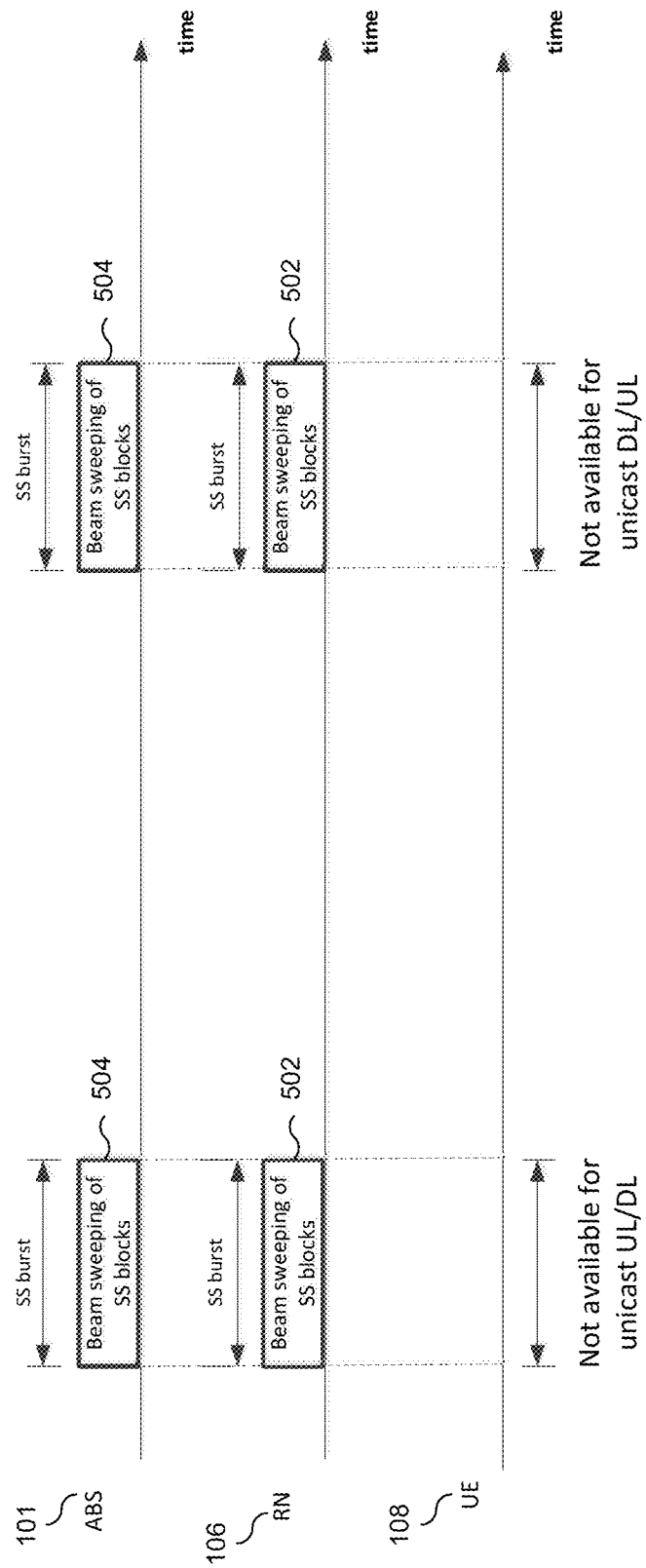
FIG. 6 illustrates an example timing diagram of aligned SS bursts according to this disclosure.

FIG. 6 illustrates an example timing diagram of aligned SS bursts according to the present disclosure. In order to reduce the complexity and latency of UE and RN cell searching, it is beneficial to increase, to the extent possible, overlapping SS blocks of the ABS and the RN in time. The RN should determine resources to be used for initial access signals (including the physical signals and physical channels needed for successful initial access) by the RN depending on the initial access signals resource used by the ABS. For example, in the embodiment of FIG. 6, SS bursts 502 transmitted by the RN use channel resources that overlap with the channel resources used by SS bursts 504 transmitted by the ABS. Accordingly, more resources are available for data transmission than are available in the embodiment of FIG. 5. However, in this embodiment, the RN and ABS should coordinate their usage of the channel resources during their SS bursts so as not to interfere with each other. In a multi-hop network, similar coordination should be implemented between a first RN and a second RN which the first RN is anchored to. The disclosure is described using the case of the RN anchoring to the ABS, however the disclosure can be extended to a case where the RN is anchored to another RN.

Figure 7A:
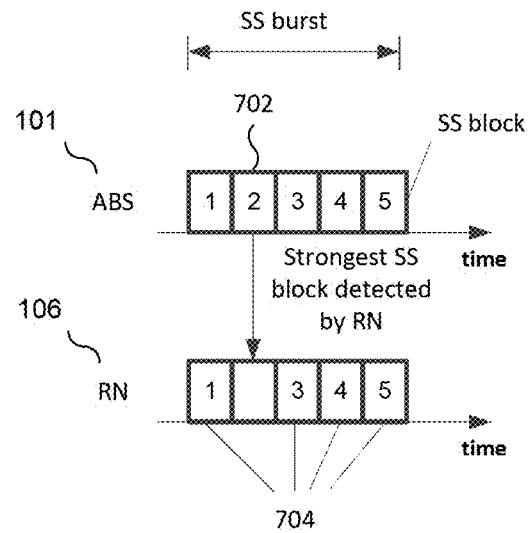
FIG. 7A illustrates an example timing diagram showing an embodiment of this disclosure in which the RN aligns its SS burst with the ABS's SS burst and chooses an SS block as the time/frequency reference from the ABS.

FIG. 7A illustrates an example timing diagram showing an embodiment of the disclosure in which the RN 106 aligns its SS burst with the ABS 101's SS burst and chooses an SS block as the time/frequency reference from the ABS 101. In this embodiment, the RN 106 performs signal measurements on the received SS blocks and then chooses the strongest received SS block 702 to monitor as the time/frequency reference from the ABS 101. That is, the chosen SS block 702 will be used by the RN 106 to receive synchronization data such as frame timing from the ABS 101. The RN 106 additionally determines its own SS block transmission opportunities from other SS blocks 704 within the SS burst. The RN 106 will use these SS blocks 704 to transmit its own SS burst to UEs 108 or to other RNs or ABSs. The RN 106 will not choose the reference SS block 702 of the ABS 101 as one of its own SS block transmission opportunities, in order to avoid self-interference (i.e., interference from the RN's signal transmission to the RN's signal reception) as it attempts to monitor that block for transmissions from the ABS 101.

Figure 7B:
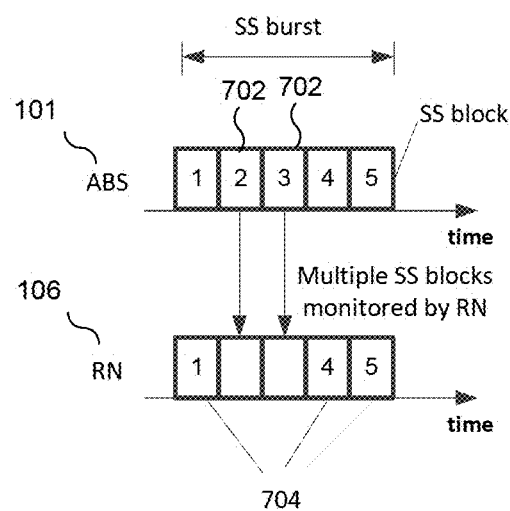
FIG. 7B illustrates an example timing diagram showing an embodiment of this disclosure in which the RN aligns its SS burst with the ABS's SS burst and chooses multiple SS blocks as the time/frequency reference from the ABS.

FIG. 7B illustrates an example timing diagram showing an embodiment of this disclosure in which the RN 106 aligns its SS burst with the ABS 101's SS burst and chooses multiple SS blocks as the time/frequency reference from the ABS 101. To provide robust reception of the synchronization signals from the ABS 101, the RN 106 can monitor or receive multiple SS blocks 702 from the ABS 101, e.g. N strongest SS blocks 702 in terms of RSRP or SINR, where N>1. The set of SS blocks 702 monitored can be selected by the RN 106 or can be indicated by the ABS 101. For example, as will be further described below, the ABS 101 may indicate the set of SS blocks 702 that it requires the RN 106 to monitor, that accordingly should be excluded by the RN 106 as candidate resources for transmitting its own SS blocks 704. In another example, the ABS 101 can indicate a signal quality threshold (configurable by the ABS or predefined), and instruct the RN 106 to monitor any SS block if the SS block signal quality is above the indicated threshold. The ABS 101 may further condition the monitoring of multiple SS blocks on the strongest SS block signal quality being below another configured or predetermined threshold.

Figure 8A:
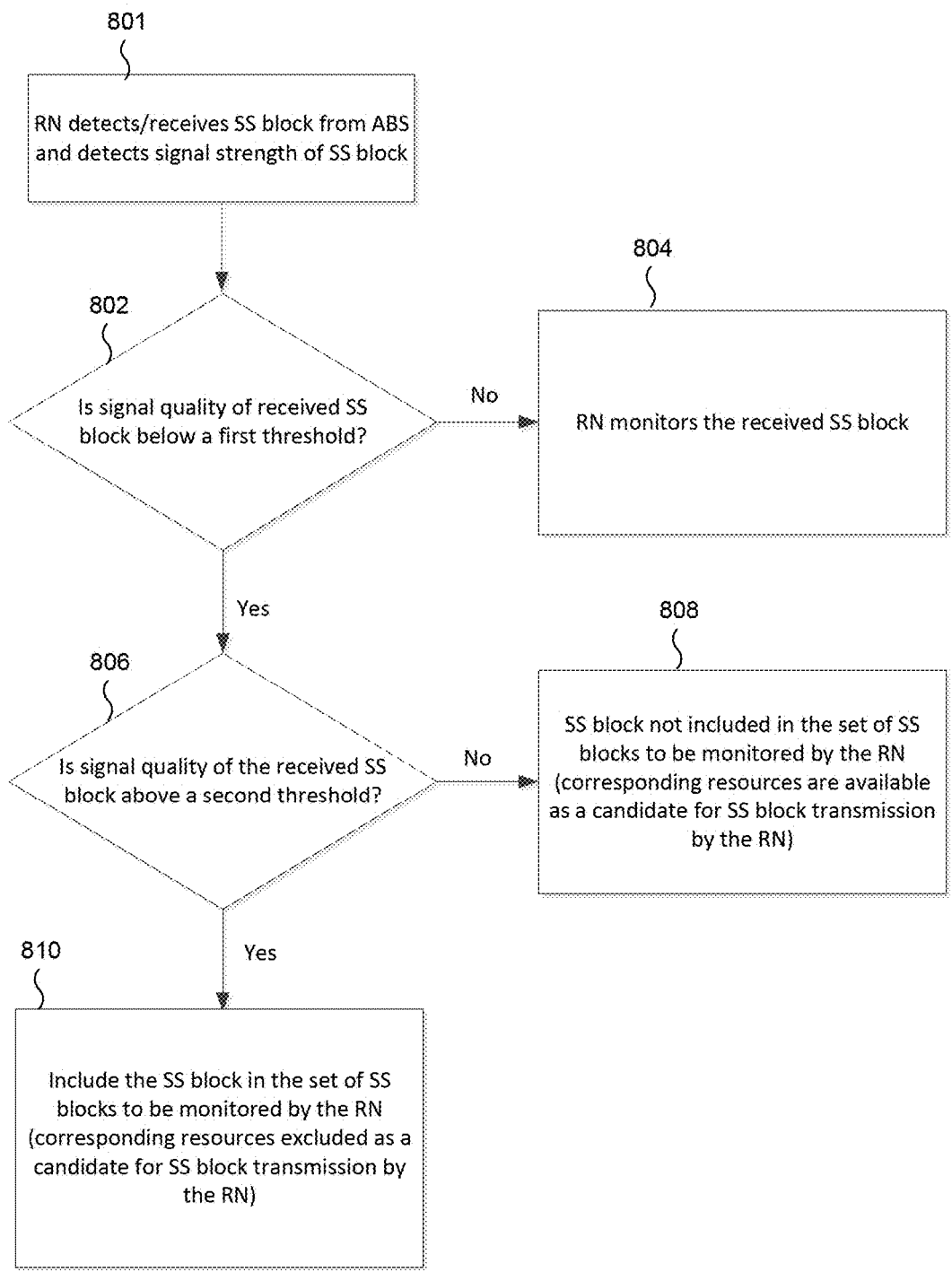
FIG. 8A illustrates an example method for monitoring, by an RN, of the SS blocks of an SS burst of an ABS according to this disclosure.
Figure 8B:
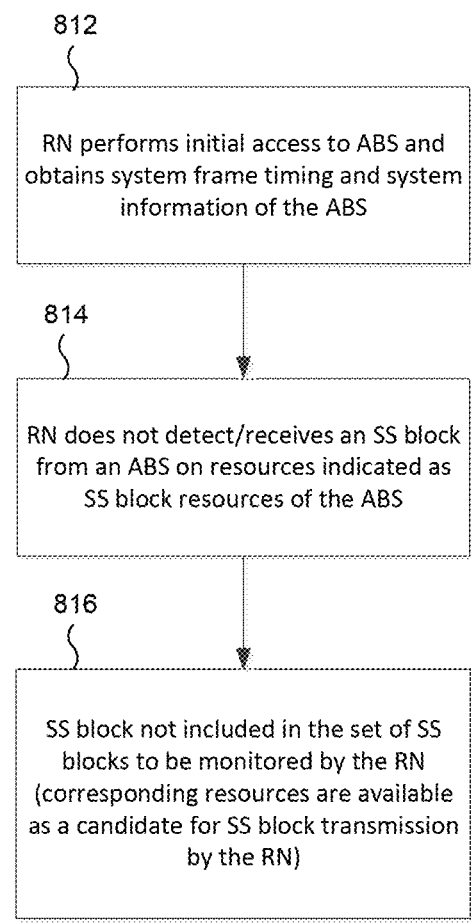
FIG. 8B illustrates another example method for monitoring, by an RN, of the SS blocks of an SS burst of an ABS according to this disclosure.

FIGS. 8A and 8B illustrate example methods for monitoring, by an RN, of the SS blocks of an SS burst of an ABS according to this disclosure. For example, the RN 106 may monitor SS bursts of the ABS 101 according to the method of FIGS. 8A or 8B, but it is understood that any RN may perform these methods. In some embodiments, the RN performs these methods upon determining for itself that it will monitor an SS burst of the ABS in order to coordinate SS burst timing. In other embodiments, the RN performs this method upon receiving instructions from the ABS directing the RN to monitor an SS burst of the ABS in order to coordinate SS burst timing.

Referring to the method of FIG. 8A, and beginning at block 801, the RN detects or receives an SS block of an SS burst from an ABS and measures the signal strength (e.g., the RSRP or SINR) of the SS block. At block 802, the RN determines whether the signal quality of the received SS block is below a first threshold. In some embodiments, this first threshold is preprogrammed in the RN. In other embodiments, the RN selects the first threshold, while in other embodiments the RN receives the first threshold configuration signal from the ABS.

If the received SS block's signal strength is not below the first threshold, then the method proceeds to block 804 and the RN monitors the received SS block for synchronization signals from the ABS.

Returning to block 802, if the received SS block's signal strength is below the first threshold, then the method proceeds to block 806 and the RN determines whether the signal strength the received SS block is above a second threshold. In some embodiments, this second threshold is preprogrammed in the RN. In other embodiments, the RN selects the second threshold, while in other embodiments the RN receives the second threshold configuration signal from the ABS.

If the received SS block's signal strength is not above the second threshold, the method proceeds to block 808 and the SS block is excluded from a set of SS blocks to be monitored by the RN for synchronization signals from the ABS. Accordingly, the channel resources used for that SS block are candidates for the RN to use to transmit its own SS burst.

Returning to block 806, if the received SS block's signal strength is above the second threshold, the method proceeds to block 810 and the SS block is included in the set of SS blocks to be monitored by the RN for synchronization signals from the ABS. Accordingly, the channel resources used for that SS block are excluded from being candidates for the RN to use to transmit its own SS burst.

Referring to the method of FIG. 8B, and beginning at block 812, the RN performs initial access to a suitable ABS and obtains system frame timing and system information of the ABS. The system information may include the actual set of channel resources used for SS block transmission by the ABS. At block 814, the RN is unable to detect or receive an SS block on channel resources which are indicated to be part of the ABS's SS block resources. At block 816, the SS block is excluded from a set of SS blocks to be monitored by the RN for synchronization signals from the ABS. Accordingly, the channel resources used for that SS block are candidates for the RN to use to transmit its own SS burst.

Figure 9:
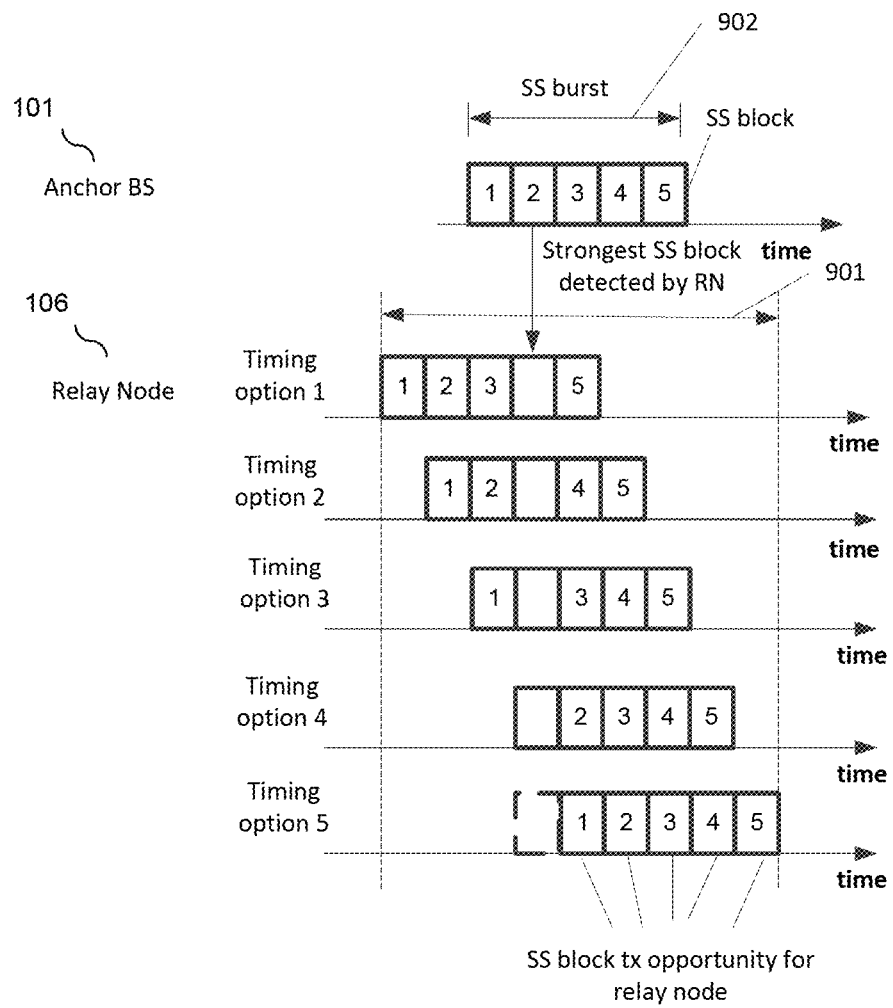
FIG. 9 illustrates an example timing diagram of an embodiment of this disclosure in which the RN has some flexibility within a window to configure its SS burst.

FIG. 9 illustrates an example timing diagram of an embodiment of this disclosure in which the RN 106 has some flexibility within a window to configure its SS burst.

This may be useful to allow for more flexibility for the RN 106 to choose its own SS blocks, configure its own frame timing or to allow for deployment scenarios where the BSs in the network do not completely align their SS burst timing (e.g. due to a lack of GPS reference). In some embodiments, the ABS 101 can configure a timing window 901 for the RN 106's candidate SS burst duration that is larger than the ABS 101's own SS burst duration 902. This allows the RN 106 more options in configuring its own timing for the SS burst transmission as illustrated. In one option, the time window 901 can be same as the time window the ABS 101 configures for the RN 106 to perform RRM measurement of the ABS 101 and a neighboring BS. In another option, these two time windows are separately configured, which allows the RN 106 an opportunity to perform measurement when in an RRM measurement time window that does not overlap with the candidate resource time window 901.

Figure 10A:
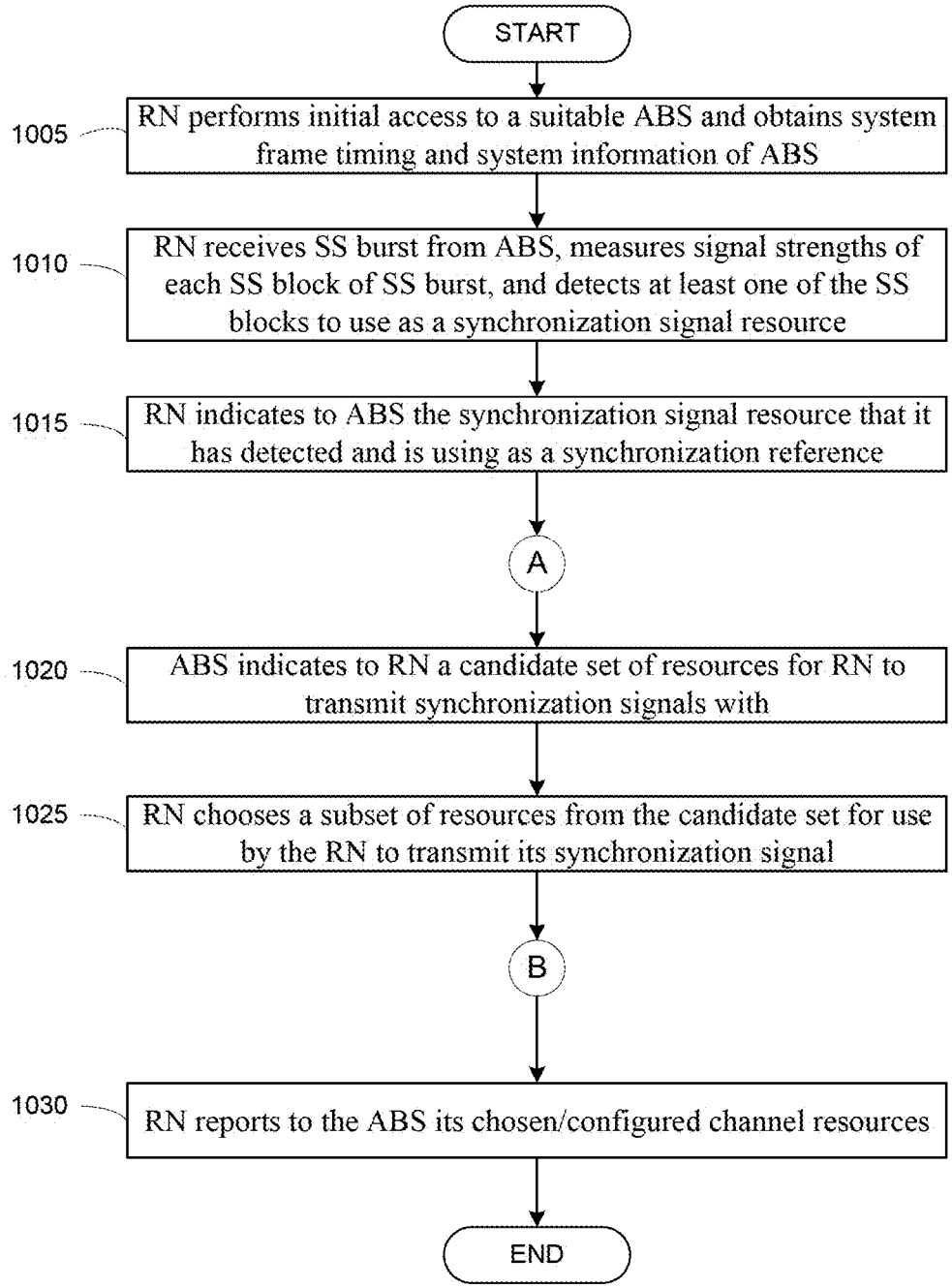
FIG. 10A illustrates an example method of an RN configuring its SS burst according to this disclosure.

FIG. 10A illustrates an example method of an RN configuring its SS burst according to this disclosure. For example, the RN may be the RN 106, the ABS may be the ABS 101. It is understood that any suitable base stations may operate as an RN or ABS for the purposes of this method.

Beginning at block 1005, the RN performs initial access to a suitable ABS and obtains the system frame timing and system information of the ABS. This provides the RN with knowledge of the timing of the SS burst of the ABS. At block 1010, the RN receives the SS burst from the ABS, measures the signal strengths or qualities of each SS block of the SS burst, and detects at least one of the SS blocks to use as a synchronization signal resource. This may be done, for example, as illustrated in FIGS. 8A and 8B.

At block 1015, the RN indicates to the ABS the synchronization signal resource that it has detected and is using as the synchronization reference (which can also be referred to as the SS block), which may be identified by an identifier. A synchronization signal resource is defined by a combination of one or more of time, frequency, or spatial (beam) resources. The report to the ABS can include the signal quality, e.g. the reference signal received quality (RSRP) or the signal to interference and noise ratio (SINR), of the detected SS block.

At block 1020, the ABS indicates to the RN a candidate set of resources that the RN shall choose from to transmit its own synchronization signals. The candidate set of resources comprises a combination of one or more of time, frequency, or spatial (beam) resources. In one example, the candidate set of resources is periodically occurring. The candidate resources can indicate the candidate SS burst durations (containing a number of SS blocks) and the candidate SS burst (or burst set) periodicities. In some embodiments, the candidate set of resources may be indicated with respect to the system frame timing of the ABS. In other embodiments, the candidate set of resources may be indicated with respect to the resource location of the reported synchronization signal resource identified by the RN. In one example, the candidate set of resources indicated can include a periodic time window with respect to the reported synchronization signal resource identified by the RN. In yet other embodiments, the candidate set of resources can be included in RRC signaling by the ABS, included as MAC signaling by the ABS, or included as L1 signaling by the ABS. It may be beneficial for the ABS to provide this indication of the candidate set of resources in order to provide a means for the ABS to coordinate the SS block resources of multiple RNs within the coverage area of the ABS to reduce inter-RN interference on the SS blocks.

At block 1025, the RN chooses (or configures) a subset of channel resources from the candidate set indicated by the ABS for use by the RN to transmit its synchronization signal. The chosen resources comprise a combination of time, frequency and spatial (beam) resources from the candidate set of resources. That is, the RN chooses a subset of resources from the candidate set of resources to use for its SS burst.

At block 1030, the RN reports to the ABS its chosen (or configured) channel resources, which can be specified using chosen SS burst durations (containing a number of SS blocks) and chosen SS burst (or burst set) periodicities. This report allows the ABS to know that transmissions on the reported channel resources will not be received by the RN (due to the risk of self-interference) since the RN will be transmitting its own synchronization signals with those resources. The report will also allow the ABS to perform interference coordination among multiple RNs associated with the ABS.

Figure 10B:
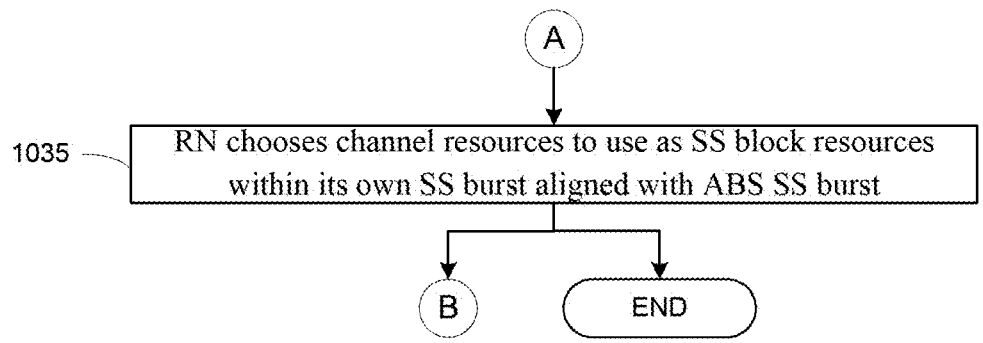
FIG. 10B illustrates another example method of an RN configuring its SS burst according to this disclosure.

FIG. 10B illustrates another example method of an RN configuring its SS burst according to this disclosure. FIG. 10B begins from point A in the method of FIG. 10A, and rejoins the method of FIG. 10A at point B.

At block 1035, the RN chooses (or configures) for itself channel resources to use as SS block resources within its own SS burst. In doing so, the RN aligns its SS burst to use the same channel resources or a subset of the channel resources used by SS bursts of the ABS. In one embodiment, method proceeds through point B to block 1030 of FIG. 10A, where the RN reports its configured SS burst to the ABS. In another embodiment, the RN does not report the chosen SS blocks to the ABS, and the method ends after block 1035.

Figure 10C:
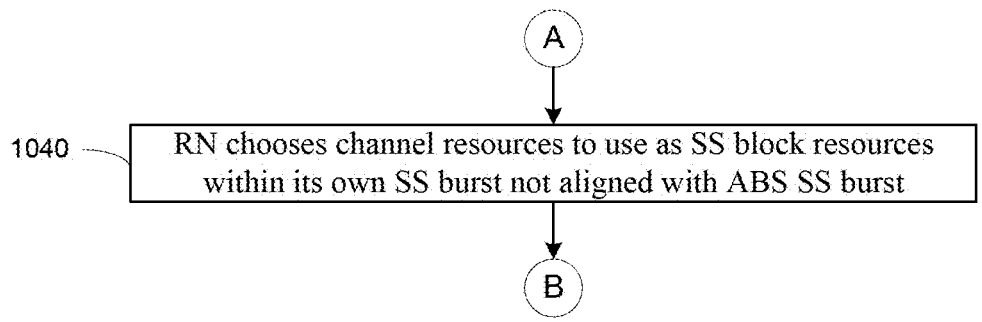
FIG. 10C illustrates another example method of an RN configuring its SS burst according to embodiments of the present disclosure.

FIG. 10C illustrates another example method of an RN configuring its SS burst according to embodiments of the present disclosure. FIG. 10C begins from point A in the method of FIG. 10A, and rejoins the method of FIG. 10A at point B.

At block 1040, the RN chooses, or (configures) for itself channel resources to use as SS block resources within its own SS burst that is not necessarily aligned with the SS burst of the ABS. The method proceeds through point B to block 1030 of FIG. 10A, where the RN reports its configured SS burst to the ABS.

In another embodiment, if the ABS indicates to the RN a candidate set of resources as in block 1020, the RN chooses a subset of resources from the candidate set as in block 1025. However, if the ABS doesn't indicate a candidate set of resources, then the RN chooses its own SS block resource as in block 1035 or 1040.

Figure 11:
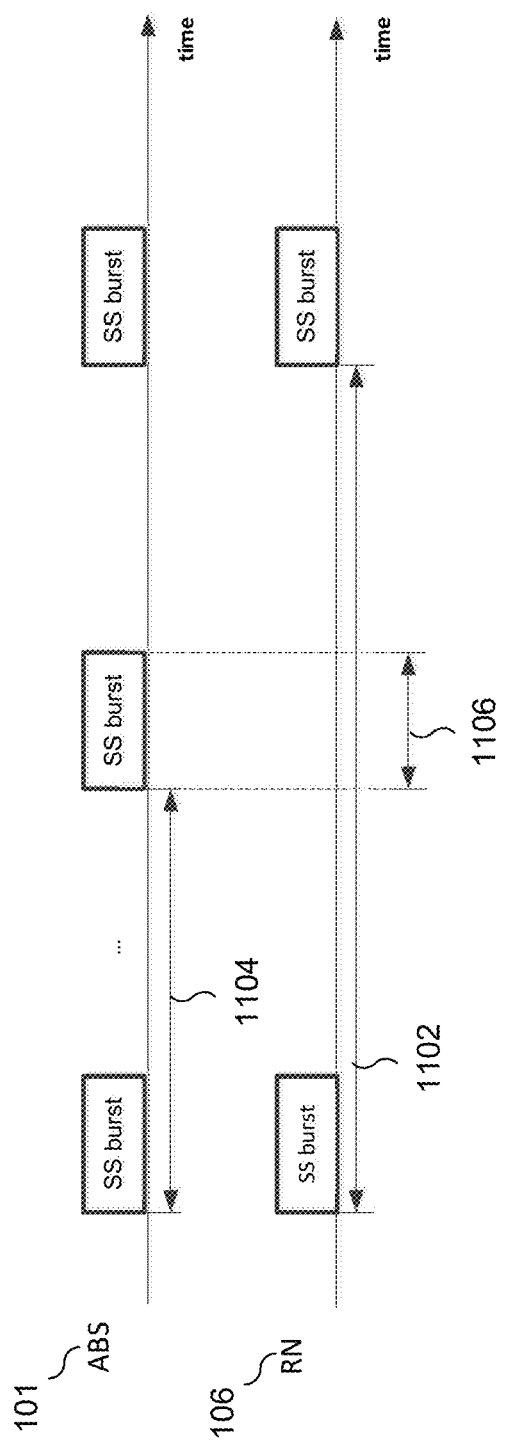
FIG. 11 illustrates an example timing diagram illustrating a method for updating the synchronization reference signal used by an RN according to this disclosure.

FIG. 11 illustrates an example timing diagram illustrating a method for updating the synchronization reference signal used by an RN, such as RN 106, according to this disclosure. In some embodiments, it may be advantageous to allow the RN 106 the opportunity to update its measurement of the SS blocks received from the ABS 101. In order to allow the RN 106 to detect and measure available synchronization signals, and to report the measurement results to the ABS 101 according to a configured reporting criterion, the RN 106 may configure a SS burst periodicity 1102 that is longer than the SS burst periodicity 1104 of the ABS 101. For example, if the SS burst periodicity 1104 of the ABS 101 is × ms, then the SS burst periodicity 1102 of the RN 106 may be configured to be 2× ms. In this way, the RN 106 may schedule a time period 1106 during which the RN 106 may monitor the entire SS burst of the ABS 101 in order to update its measurement of the strongest SS blocks in the SS burst, for example as described in FIGS. 7A, 7B, and 8. If needed, the RN 106 may update the SS block that is uses as a synchronization resource for the ABS 101, for example as described in FIGS. 10A-10C.

In some embodiments, the RN 106 can configure its SS burst periodicity to be the same as that of the ABS 101 (i.e., such that the RN 106 transmits its SS burst every time the ABS 101 transmits its SS burst), but in order to allow the RN 106 opportunities for measuring available SS blocks received from the ABS 101, the RN 106 indicates to its UEs (such as UEs 108) that it will skip transmission of a specific SS burst, or that it will periodically skip transmission of its SS burst. In this way, the UEs will not think they have lost connection with the RN 106 due to an unreceived SS burst that they were expecting. The indication can be delivered by broadcast or unicast higher layer signaling. The indication can indicate the periodicity at which the SS burst will be skipped. The indication can also be carried in a physical broadcast channel, including using a common control channel (i.e., common PDCCH). The indication can also be carried in a unicast control channel (i.e., UE-specific PDCCH).

Figure 12:
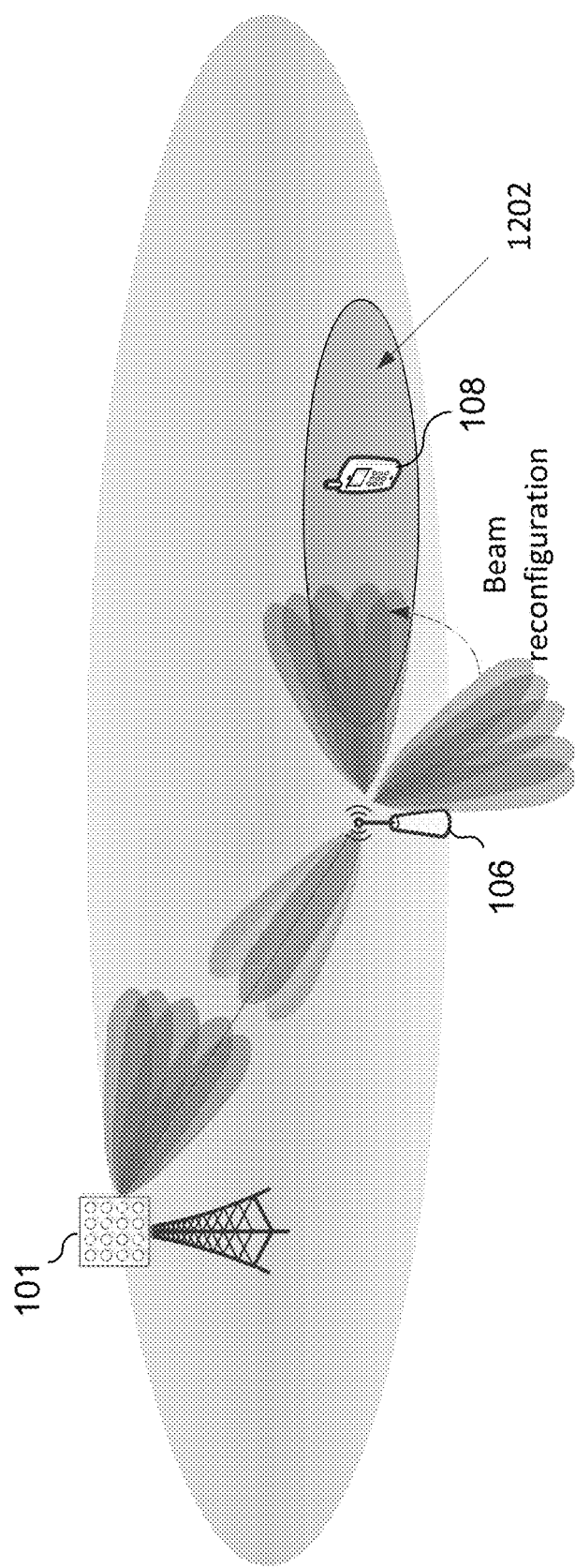
FIG. 12 illustrates an example network diagram showing coverage areas of the ABS and the RN according to this disclosure.

FIG. 12 illustrates an example network diagram showing coverage areas of the ABS 101 and the RN 106 according to this disclosure. It may be beneficial for the ABS 101 and the RN 106 to coordinate their respective coverage areas to improve network capacity and performance, for example by instructing an RN 106 to provide coverage to an area that the ABS 101 cannot cover. The ABS 101 can indicate to the RN 106 that it should adopt one or more of the below configurations in order to coordinate coverage with the ABS 101. The ABS 101 may indicate the configuration to the RN 106 with, for example, higher layer signaling (RRC, MAC) or L1 signaling (e.g., by PDCCH).

In one configuration embodiment, the ABS 101 may indicate to the RN 106 a transmit power or a range of transmit power that the RN 106 should use. This allows the ABS 101 to control the transmission range (as well as the interference range) of the RN 106. In some embodiments, the RN 106 may change its transmit power over time so that measurement reports (e.g., a RRM or CSI report) of UEs, such as UEs 108, (or other RNs, for a multi-hop network) that are measuring the RN can be obtained by the ABS 101. The ABS 101 is then able to decide an appropriate transmit power for the RN 106 and to indicate this transmit power to the RN 106.

In another configuration embodiment, the ABS 101 may indicate to the RN 106 a direction of transmission beams (horizontal angle, vertical angle, or both) to use for transmitting the RN 106's SS blocks and broadcast channels. This allows the ABS 101 to control the spatial coverage of the RN 106 transmissions. In some embodiments, the RN 106 may change its beam direction over time so that measurement reports (e.g., a RRM or CSI report) of the UEs 108 (or other RNs, for multi-hop network) can be obtained by the ABS 101. The ABS 101 is then able to decide appropriate beam directions for the RN 106 to use, and is able to indicate to the RN 106 (e.g., as beam IDs) that it should use these beam directions.

In this way, the ABS 101 may determine, when it does not have good coverage of an area such as area 1202, to instruct the RN 106 to adjust beams or transmission power to cover the area 1202. In other cases, when the ABS 101 or another RN 106 already has strong coverage of an area, the ABS 101 can instruct the RN 106 to adjust its beams away from that area or to reduce its transmission power to avoid interfering with that area.

Figure 13:
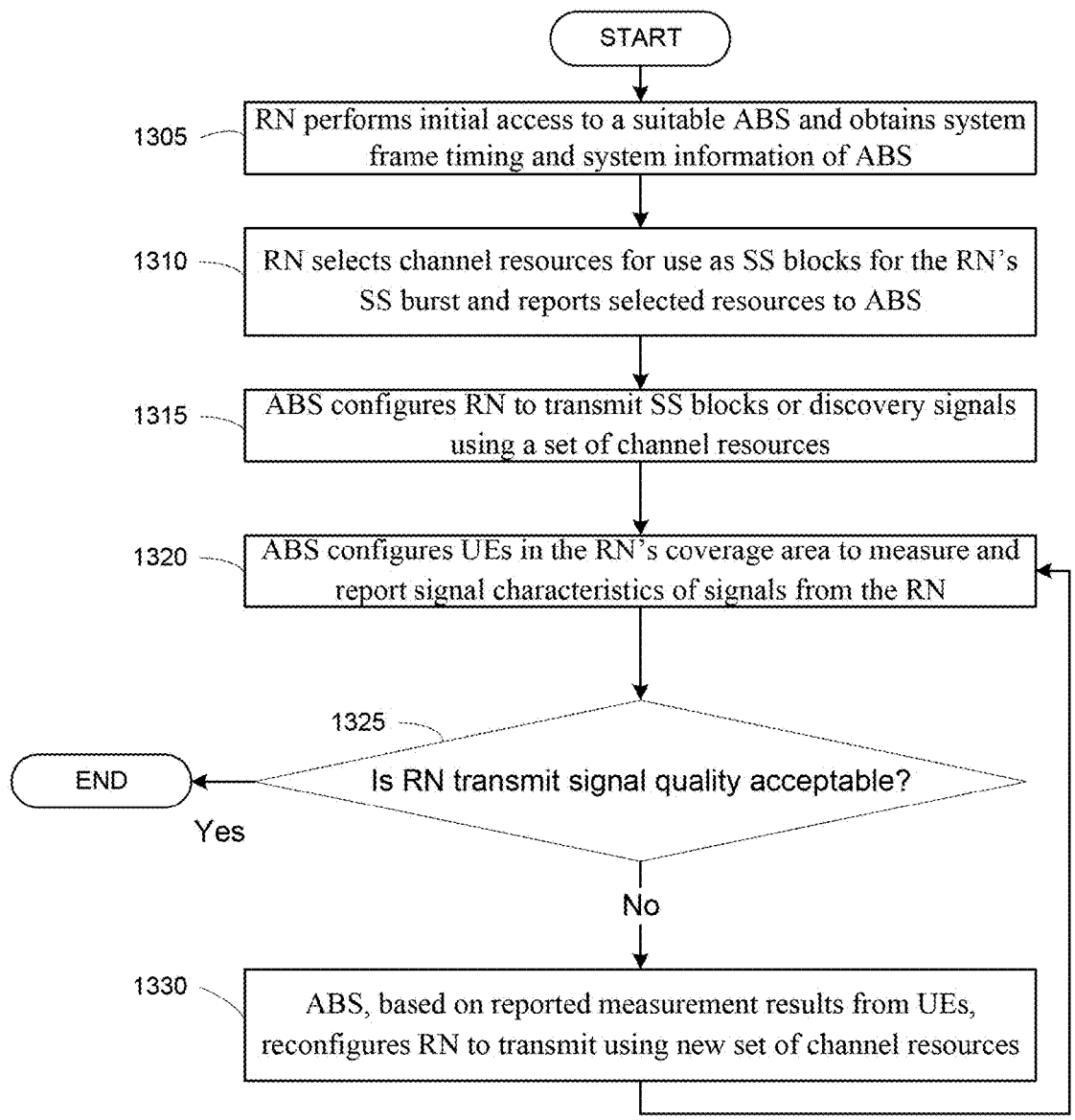
FIG. 13 illustrates an example method for coverage coordination between the ABS and the RN according to this disclosure.

FIG. 13 illustrates an example method for coverage coordination between the ABS 101 and the RN 106 according to this disclosure. For example, this method may be used to coordinate coverage of the RN 106 as described with respect to FIG. 12. It is understood that any suitable base stations may operate as an RN 106 or ABS 101 for the purposes of this method.

At block 1305, the RN 106 performs initial access to a suitable ABS 101 and obtains the system frame timing and system information of the ABS 101.

At block 1310, the RN 106 selects channel resources for use as SS blocks for the RN 106's SS burst and reports the selected resources to the ABS 101. The channel resources may include time and frequency resources, a number of transmit beams or transmit beam sets that the RN 106 can use to transmit the SS blocks, and the angle of departure of the transmit beams relative to the receive beam of the RN 106 used to receive the anchor ABS 101's SS blocks. The information of the selected SS block resource may also include the RN coverage information, and other information used for inferring the RN's coverage can also be included in the report. In one embodiment, the selected resources reported by the RN are the candidate resources available to the RN for transmission. For the remaining of the disclosure, the transmit beam ID of the RN 106's SS block is assumed reported.

At block 1315, the ABS 101 configures the RN 106 to transmit SS blocks or discovery signals using a set of channel resources. The ABS 101 may configure the transmit power, the set of beams the RN 106 should use, or the beam direction of that set of beams (horizontal angle, vertical angle, or both) for transmission of the SS blocks or discovery signals of the RN 106. In this way, the ABS 101 is able to configure the coverage area of the RN 106.

At block 1320, the ABS configures UEs 108 (or another RN) in the RN's coverage area to measure the signal characteristics (e.g., signal strength) of SS blocks or discovery signals of the RN 106, for example by relaying such configuration instructions through the RN 106 to the UEs 108. The ABS 101 will additionally configure the UEs 108 (or another RN) to report the results of the measurements back to the ABS 101.

At decision block 1325, the ABS 101, based on the reported measurement results from the UEs 108 (or another RN), determines whether the RN 106's configuration has resulted in acceptable signal quality in the desired coverage area. If not, the method proceeds to block 1330.

At block 1330, the ABS 101 reconfigures the RN 106 to transmit SS blocks or discovery signals using a new set of channel resources. The ABS 101 may instruct the RN 106 to change some or all of the channel resources used for transmission of the SS blocks or discovery signals. In this way, the ABS 101 can iteratively adjust the coverage area of the RN 108 to better fill coverage gaps in the network.

Embodiments of the present disclosure recognize that in some circumstances, an RN 106 may have important transmission or reception tasks to perform with respect to UEs 108 that the RN 106 serves, and may need to protect a set of channel resources from interference by the ABS 101 in order to perform these tasks. For example, in an embodiment the RN 106 may generally perform scheduling based on the scheduling decision of the ABS 101 it is connected to, but the RN 106 may not be able to transmit and receive signals simultaneously due to a resulting strong self-interference. This may be referred to as the half-duplex constraint. In particular, the RN 106 may either transmit to the ABS 101 and its UE(s) 108, or receive from the ABS 101 and its UE(s) 108 at any given time, but not both.

In some embodiments, even when the RN 106's scheduling is dependent on decisions of the ABS 101, the RN 106 also may configure its radio resources in a semi-static or static manner for usage that should not be affected by ABS 101 scheduling decisions. One example of such a usage is a system information broadcast from the RN 106 to UE(s) 108 served by the RN 106, or to other RNs connected to the RN 106 in a multi-hop network. In this example, while the RN 106 is transmitting the system information, it may be desirable from the RN point of view not to need to receive any transmissions from the ABS 101 so as to avoid the potential of strong self-interference.

Figures 14, 15:
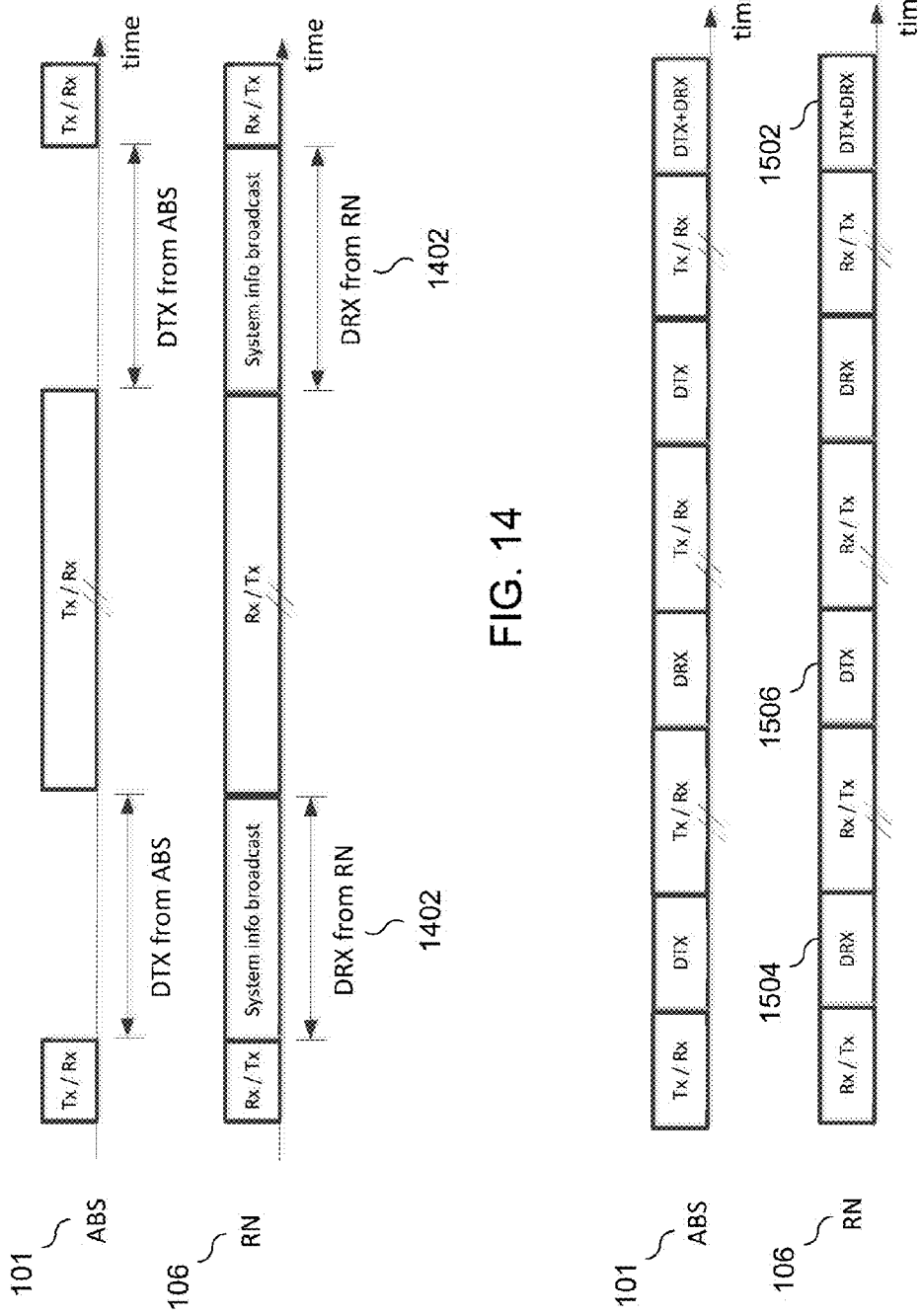
FIG. 14 illustrates an example timing diagram showing coordination of the RN with the ABS to protect channel resources for use by the RN according to this disclosure.
FIG. 15 illustrates an example timing diagram showing coordination of the RN with the ABS to protect channel resources for use by the RN, wherein the RN configures various different link activity constraints of the ABS with the RN, according to this disclosure.

FIG. 14 illustrates an example timing diagram showing coordination of the RN 106 with the ABS 101 to protect channel resources for use by the RN 106 according to this disclosure. Although FIG. 14 illustrates only the time domain, it is understood that the same principles may be applied to frequency domain resources and spatial resources.

In this embodiment, the RN 106 determines that there is a pending important broadcast of system information to perform during time slot 1402, where the target device is not the ABS 101. Based on this determination, the RN 106 may inform the ABS 101 that the RN 106 needs to protect channel resources (e.g., time, frequency, or beam angles) in time slot 1402 for its use without interference due to the ABS 101. The RN 106 then performs discontinuous reception (DRX) momentarily (e.g., for the duration of time slot 1402) when it is transmitting the system information. During the DRX period, the RN 106 should not be requested to receive a DL transmission from the ABS 101 as this would disrupt the system info transmission operation by halting the transmission and switching to receiving from the ABS 101. Accordingly, the ABS 101 is put into a discontinuous transmission (DTX) mode during the time slot 1402. In another embodiment, the RN 106 would not be able to receive the signals from the ABS 101 if it continues the system information broadcast operation.

In another embodiment, the RN 106 may be receiving Ultra-Reliable and Low Latency Communications (URLLC) data from another node such as a UE 108 or another RN. The RN 106 may request that the ABS 101 does not transmit to the RN 106 during the time period when the URLLC operation will take place, as this could interfere with the URLLC operation. Similarly, the RN 106 may request that the ABS 101 not send any requests for the RN 106 to transmit data during the time period of the URLLC operation.

In yet another embodiment, the RN 106 may wish to use the above procedure to reserve some channel resources for transmission or reception of important physical signals or control information for basic access operations. These signals may include synchronization signals, channel state information reference signal (CSI-RS), tracking reference signal (RS), sounding reference signal (SRS) or uplink control information (UCI) signals.

In some embodiments, there may also be channels with predetermined transmission resources due to the predefined slot/subframe/frame structures. For example, resources for the backhaul PDCCH and the access PDCCH regions may already be predetermined to be located in the first few OFDM symbols of a time slot. It may be predetermined that the RN 106 shall receive transmissions from the ABS 101 in the backhaul PDCCH region, or that the RN 106 is not expected to receive transmissions from the ABS 101 in the access PDCCH region.

FIG. 15 illustrates an example timing diagram showing coordination of the RN 106 with the ABS 101 to protect channel resources for use by the RN 106, wherein the RN 106 configures various different link activity constraints of the ABS 101 with the RN 106, according to this disclosure. In one embodiment, for a given set of channel resources 1502, it may be the case that no link activity on that set of channel resources is allowed with the RN 106, including transmission to the RN 106 or reception from the RN 106, which may be described as both DTX and DRX from the RN's perspective. This may be the case when the RN 106 is in a power saving mode, or is listening to the wireless channel for interference or while performing node discovery. In another embodiment, for a given set of channel resources 1504, reception from the RN 106 is allowed but transmission to the RN 106 is not allowed. This may be described as DRX from the RN 106's perspective, and DTX from the ABS 101's perspective. In yet another embodiment, for a given set of channel resources 1506, reception from the RN 106 is not allowed but transmission to the RN 106 is allowed. This may be described as DTX from the RN 106's perspective and DRX from the ABS 101's perspective.

In this way, the ABS 101 and the RN 106 coordinate to establish a common understanding of the link activity constraint type and the corresponding resources in which the constraint is applied. The constraints described as DTX, DRX or both from the point of view of the RN 106 to the ABS 101 or to other RNs that it is connected to may alternatively be referred to as reserved or protected resources from the RN 106's point of view. In the time domain, the channel resource impacted by the constraint can be described in terms of duration (e.g., in terms of a number of OFDM symbols, slots, or subframes) or periodicity (e.g., in terms of radio frames). The channel resources subject to constraints may also include frequency domain resources (e.g., component carriers, resource blocks, resource block groups, or subbands). The channel resources subject to constraints may further include spatial resources (e.g., beam IDs or beam angles). The coordination message can also include a reason for resource protection, such as for system information transmission or for URLLC data transmission/reception. The ABS can grant or reject the RN's request depending on other information available at the ABS.

Figure 16A:
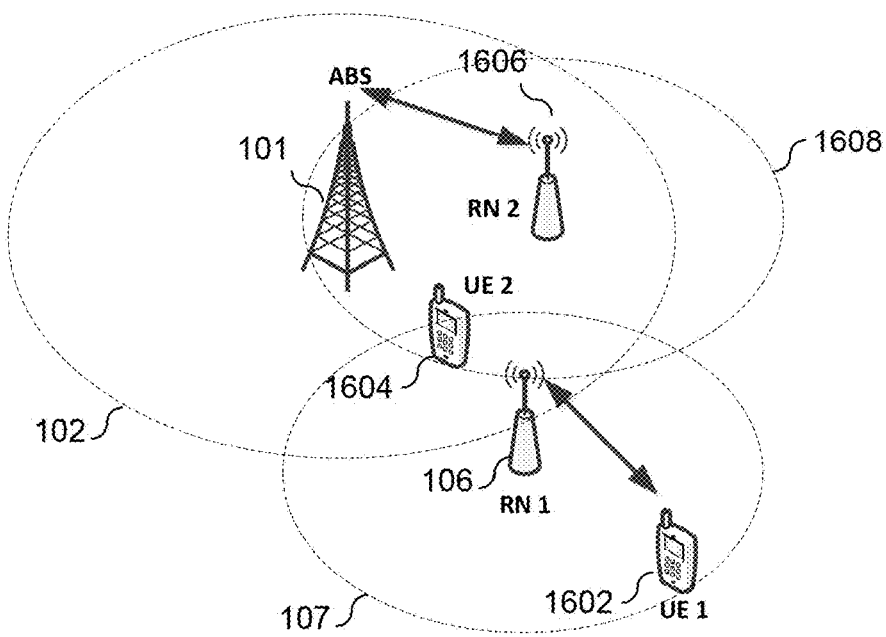
FIG. 16A illustrates an example cellular system is illustrated, according to this disclosure, in which an RN requests a DRX or DTX constraint from the ABS with respect to the RN, but the ABS is able to communicate with other devices.
Figure 16B:
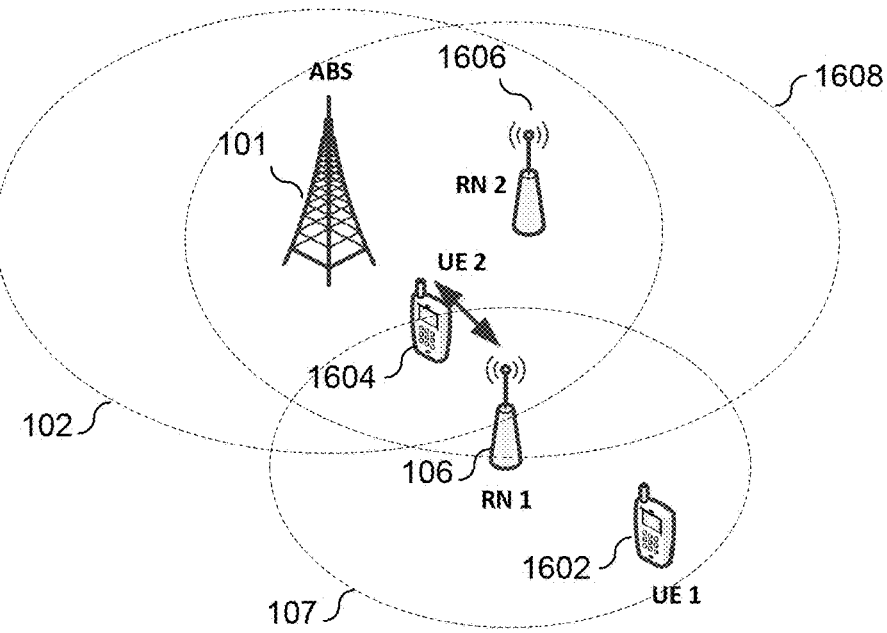
FIG. 16B illustrates an example cellular system is illustrated, according to this disclosure, in which an RN requests a DRX or DTX constraint from the ABS with respect to the RN, and the ABS refrains from communicating with other devices.

FIGS. 16A and 16B illustrate example cellular systems having varying link constraints between the RN 106 and other devices according to embodiments of the present disclosure. In some embodiments, the RN 106 may not want to transmit to or receive from a first adjacent device (or node), but would still like to transmit to or receive from a second adjacent device (or node). In other words, DTX or DRX link constraint behavior may be targeted to a certain adjacent device (for example, the first adjacent device). It may be useful to inform the targeted first adjacent device about the need for link constraints. For example, by informing the targeted first adjacent device that the RN 106 intends to receive from the second adjacent device, the first adjacent node can avoid transmitting to another node in the vicinity of the RN 106 which could potentially interfere with the reception of the RN 106.

Referring now to FIG. 16A, an example cellular system is illustrated, according to this disclosure, in which an RN 106 requests a DRX or DTX constraint from the ABS 101 with respect to the RN 106, but the ABS 101 is able to communicate with other devices. This may be known as Type 1 DRX or DTX protection. For example, the RN 106 may be making an important transmission to UE1 1602 on a set of channel resources (which it therefore wishes to protect), and accordingly may enter DRX mode with respect to ABS 101 on that set of channel resources (and may request that the ABS 101 enter DTX mode with respect to the RN 106 on that set of channel resources). That is, the RN 106 requests that the ABS 101 not transmit to the RN 106 using the protected channel resources, because the RN 106 will not be able to receive transmissions from the ABS 101 using the protected channel resources. However, in this embodiment the ABS 101 may still be able to use the protected channel resources to transmit to another device such as RN2 1606, as such a transmission will not interfere (or will interfere an acceptably small amount) with the UE1 1602's ability to receive the transmission from RN 106. This may be, for example, because UE1 is outside of ABS 101's coverage area 102.

Similarly, the RN 106 may expect to receive an important transmission from the UE1 1602 on a set of channel resources, which it therefore wishes to protect, and accordingly may enter DTX mode with respect to ABS 101 on that set of channel resources (and may request that the ABS 101 enter DRX mode with respect to the RN 106 on that set of channel resources). That is, the RN 106 requests that the ABS 101 not ask the RN 106 to transmit anything to the ABS 101 using the protected channel resources, because the RN 106 will not be able to transmit to the ABS 101 using the protected channel resources. However, in this embodiment the ABS 101 may still be able to use the protected channel resources to receive transmissions from another device such as the RN2 1606, as such a transmission will not interfere with the RN 106's ability to receive the transmission from UE1 1602. This may, for example, be due to the fact that RN 106 is outside of RN2 1606's coverage area 1608, or it may be due to beamforming characteristics of the protected channel resources.

Referring now to FIG. 16B, an example cellular system is illustrated, according to this disclosure, in which an RN 106 requests a DRX or DTX constraint from the ABS 101 with respect to the RN 106, and the ABS 101 refrains from communicating with other devices. This may be known as Type 2 DRX or DTX protection. For example, the RN 106 may be making an important transmission to UE2 1604 on a set of channel resources, which it therefore wishes to protect, and accordingly may enter DRX mode with respect to ABS 101 on that set of channel resources (and may request that the ABS 101 enter DTX mode with respect to the RN 106 on that set of channel resources). That is, the RN 106 requests that the ABS 101 not transmit to the RN 106 using the protected channel resources, because the RN 106 will not be able to receive transmissions from the ABS 101 using the protected channel resources. In this embodiment, if the ABS 101 uses the protected channel resources to transmit to another device such as RN2 1606, the transmission will interfere with the UE2 1604's ability to receive the transmission from RN 106. This may be, for example, because the RN 106 is within the ABS 101's coverage area 102. Accordingly, the RN 106 may inform the ABS 101 that it should refrain from transmitting altogether using the protected channel resources during the DRX time period.

Similarly, in another embodiment, the RN 106 may expect to receive an important transmission from the UE2 1604 on a set of channel resources, which it therefore wishes to protect, and accordingly may enter DTX mode with respect to ABS 101 on that set of channel resources (and may request that the ABS 101 enter DRX mode with respect to the RN 106 on that set of channel resources). That is, the RN 106 requests that the ABS 101 not ask the RN 106 to transmit anything to the ABS 101 using the protected channel resources, because the RN 106 will not be able to transmit to the ABS 101 using the protected channel resources. In this embodiment, if the ABS 101 requests transmissions from the RN2 1606 using the protected channel resources, the transmission will interfere with the RN 106's ability to receive the transmission from UE2 1604. This may be, for example, because the RN 106 is within the coverage area 1608 of another device such as RN2 1606, or it may be due to beamforming characteristics of the protected channel resources.

In some embodiments of the present disclosure, the RN 106 has a scheduling capability and decides which constraints exist between the RN 106 and other devices, such as ABS 101, for a set of channel resources. In one signaling method, the RN 106 indicates to the ABS 101 (or any other suitable device such as another RN) via higher layer signaling (such as RRC) the channel resources to protect with DRX or DTX constraints, and the type of protections if more than one is defined (e.g. the Type 1 or Type 2 DRX or DTX implementations of either FIG. 16A or FIG. 16B). The signaling method may be suitable to configure periodically occurring channel resources to be used for synchronization signals, system information broadcasts, and periodic CSI-RS. In another embodiment, MAC CE signaling can be employed to provide added flexibility for the RN 106 to activate or deactivate the channel resources that are to be protected. The signaling method may be suitable to configure unpredictably utilized channel resources to be used for time sensitive data such as, e.g., URLLC data. Use of MAC CE signaling may allow faster reaction by the RN 106 to the receipt and handling of important but unpredictable data.

In yet another embodiment, dynamic signaling by the RN 106 to the ABS 101 (or another RN) can also be configured to enable the RN 106 to dynamically update the ABS 101 (or the other RN) on resources that are to be protected. Dynamic signaling may be beneficial for dynamic adaptation due to the RN 106's dynamic scheduling decision and in order to provide protection to RN communications that can be latency sensitive (such as URLLC traffic from a UE served by the RN 106). Dynamic signaling by the RN 106 to the ABS 101 can be a type of Uplink Control Information (UCI) that is transmitted with a physical uplink control channel (PUCCH) or a PUSCH.

Figure 17:
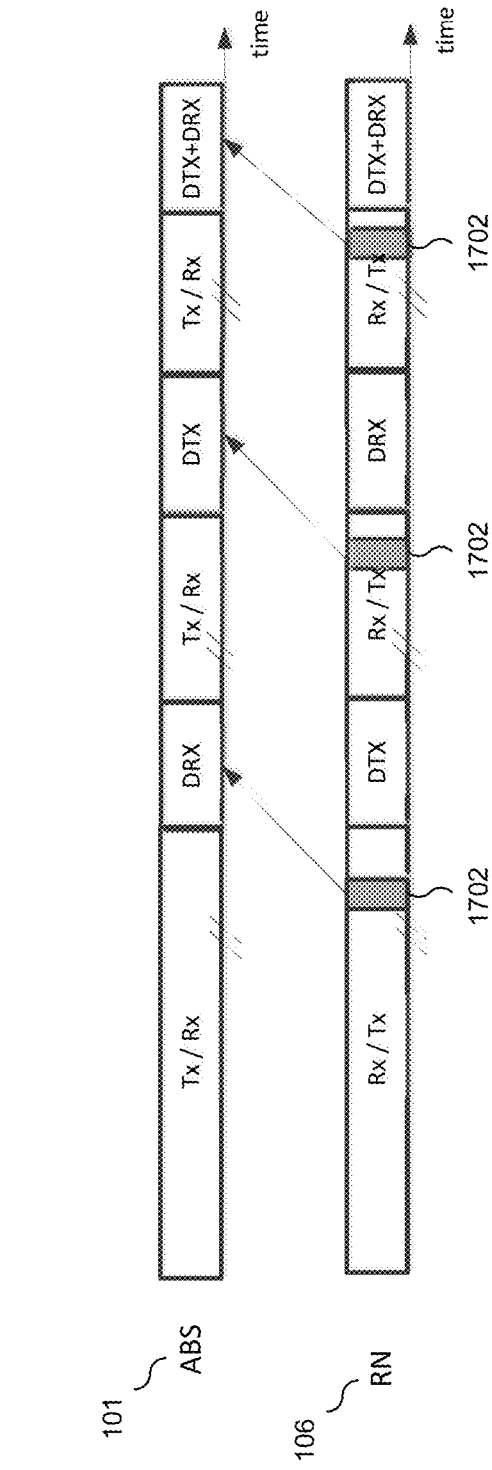
FIG. 17 illustrates an example timing diagram illustrating the use of dynamic signaling by the RN to schedule DTX and DRX protection according to this disclosure.

FIG. 17 is an example timing diagram illustrating the use of dynamic signaling by the RN 106 to schedule DTX and DRX protection according to this disclosure. The UCI 1702 can be called DRX request, DTX request, protection request, or reservation request. The UCI 1702 may request DRX protection, DTX protection, or both DRX and DTX protection, as described above. To save dynamic signaling overhead, a set of possible protected channel resources, each associated with a resource index, may be first determined by RRC configuration by the RN 106, then the dynamic signaling can indicate the resource index that should be protected and the timing of the protection (i.e., when the protection should begin and the duration of the protection). In another embodiment, the RRC configuration of the set of possible protected channel resources is done by the ABS 101, and the RN 106 indicates via dynamic signaling the actual resource to be protected.

Figure 18:
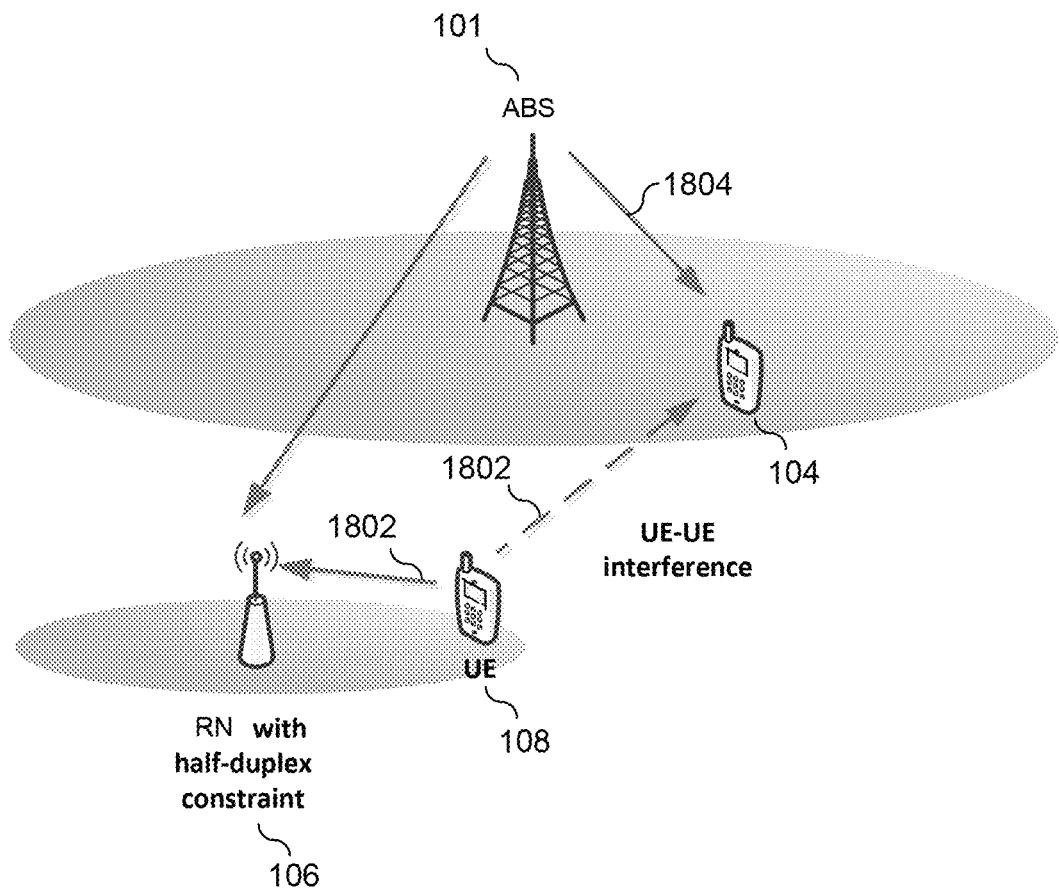
FIG. 18 illustrates an example cellular system exhibiting cross-link interference according to this disclosure.

FIG. 18 illustrates an example cellular system exhibiting cross-link interference according to this disclosure. Cross-link interference may refer to any interference between transmissions over different links using same channel resources. In this embodiment, UE to UE cross-link interference may be caused by, for example, the ABS 101 transmitting to both the RN 106 and a UE 104 at the same time, and the RN 106 receiving from both the ABS 101 and a UE 108 at the same time, when transmissions use the same time and frequency resources. The cross-link interference may occur in this scenario because the transmission 1802 from the UE 108 to the RN 106 also reaches the UE 104, interfering with the transmission 1804 from the ABS 101 to the UE 104. It is understood that other types of cross-link interference may occur in such a system. For example, UE to UE interference at the UE 108. In another example, if ABS 101 and RN 106 are both standalone base stations (i.e., RN 106 is not functioning as a relay node), and are accordingly not coordinating to align their DL and UL frames, cross-link interference may occur.

In some embodiments, the network indicates to a UE, such as UE 104 or 108, the DL time-frequency resources that the UE may or shall experience dynamic interference on. The network may refer to any suitable device, such as a serving BS, that can provide this information to the UE. The network indication can be done through higher layer signaling (e.g., RRC signaling or MAC signaling). Higher layer signaling may be beneficial when the resource-specific interference can be anticipated by the network in a semi-static manner, for example as a result of inter-BS coordination, such that cross-link interference may be present for a first set of resources and not present for a second set of resources. The higher layer signaling can be broadcast to UEs or can be unicast to the UEs. Since dynamic interference can be a UE-specific condition (e.g. at a cell edge), UE-specific higher layer signaling can be advantageous.

For example, the higher layer signaling in these embodiments may include higher layer signaling that indicates a set of slots or subframes, within a frame or multiple frames (e.g. in the form of a bitmap), where dynamic interference is present. Alternatively, higher layer signaling could indicate a set of frequency domain resources, such as resource blocks (RBs) or physical resource blocks (PRBs) where dynamic interference is present. In another embodiment, higher layer signaling could indicate both of the above sets of information. The higher layer signaling may be separate for time domain resources and for frequency domain resources, or can jointly indicate a set of time-frequency resources.

In other embodiments, the network indication of dynamic interference may be carried in dynamic control information (Dynamic CI). The Dynamic CI signaling can be common to the UEs in the system. The Dynamic CI signaling can also be UE-specific. Since dynamic interference can be a UE-specific condition (e.g. at a cell edge), UE-specific Dynamic CI signaling can be advantageous. Examples of Dynamic CI signaling may be similar to the examples of higher layer signaling.

For example, Dynamic CI signaling in these embodiments may include dynamic signaling that indicates a set of slots or subframes, within a frame or multiple frames (e.g. in the form of a bitmap), where dynamic interference is present. Dynamic CI signaling may additionally include dynamic signaling that indicates a set of frequency domain resources, such as resource blocks or physical resource blocks, where dynamic interference is present. Dynamic CI signaling may further include an indication both of the above sets of information. The Dynamic CI signaling can be separate for time domain resources and for frequency domain resources, or can jointly indicate a set of time-frequency resources.

Dynamic signaling may be beneficial if the dynamic interference condition can be controlled by a network scheduler in a dynamic manner. For example, when the dynamic interference is cross-link interference between UEs served by a full-duplex BS. In another example scenario, the dynamic interference is cross-link interference between two UEs, each served by different transmit-receive points (TRPs) that are connected to a central scheduler.

Indication of dynamic interference may also be provided with a combination of higher layer signaling and Dynamic CI signaling. For example, higher layer signaling may indicate a first set of time or frequency or time-frequency resources with dynamic interference. Dynamic CI signaling may further indicate a second set of time or frequency or time-frequency resources with dynamic interference within a set of resources excluded from the first set of resources. The UE may assume the resources with dynamic interference are the union of the higher layer signaling and dynamic signaling.

In another example, higher layer signaling may indicate a first set of time or frequency or time-frequency resources with dynamic interference. Dynamic CI signaling may further indicate a second set of time or frequency or time-frequency resources with dynamic interference. The two sets of resources are independent in this example. The UE may assume the resources with dynamic interference are the union of the higher layer signaling and dynamic signaling.

In a third example, higher layer signaling may indicate a first set of time or frequency or time-frequency resources with possible dynamic interference. The Dynamic CI signaling may further indicate a second set of time or frequency or time-frequency resources with dynamic interference within the first set of resources. The UE may assume the resources with dynamic interference are those indicated by dynamic signaling. In one embodiment, the higher layer signaling indicates time resources and the dynamic signaling indicates frequency resources within the indicated time resources.

In some embodiments, the network indication may also be performed jointly with UE-common Dynamic CI signaling and UE-specific Dynamic CI signaling. Joint higher layer signaling and Dynamic CI signaling can be applied to joint UE-common Dynamic CI signaling and UE-specific Dynamic CI signaling by replacing higher layer signaling with UE-common signaling, and Dynamic CI signaling with UE-specific Dynamic CI signaling. The UE-common Dynamic CI signaling can indicate the resources in a semi-static manner and may be transmitted less frequently (e.g. once every tens of milliseconds); while the UE-specific Dynamic CI signaling can indicate the resources in a dynamic manner and may be transmitted more frequently (e.g. every subframe or slot).

In some embodiments, the above signaling methods may be used between BSs or between UEs, rather than between a BS and a UE.

In one example scenario, BSs of a network operate with dynamic TDD or unsynchronized TDD for a set of time resources (slots or subframes) that are coordinated beforehand. The BSs indicate through higher layer signaling to the UEs the set of time resources with possible dynamic interference. The BSs may also send the signaling only if sufficient dynamic interference or cross-link interference level are detected or measured by the BSs, or by the UEs which report to the BSs. In this case, there may be a separate higher layer signaling to indicate to the UEs to detect or measure and report the presence of dynamic interference on the set of time resources.

Figure 19:
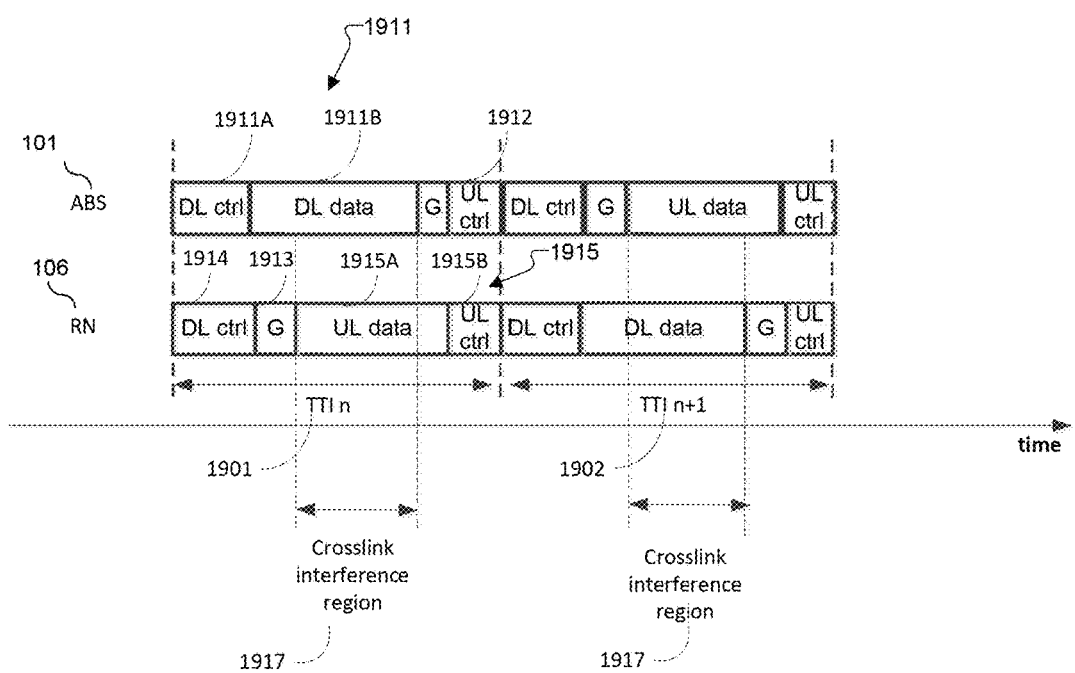
FIG. 19 illustrates an example an example timing diagram depicting a frame structure of the ABS and the RN, including DL and UL data transmissions to UEs such as UEs, where dynamic cross-link interference is present, according to this disclosure.

FIG. 19 illustrates an example timing diagram depicting a frame structure of the ABS 101 and the RN 106, including DL and UL data transmissions to UEs such as UEs 108, where dynamic cross-link interference is present, according to this disclosure.

In this embodiment, the transmission time intervals (TTIs) of the ABS 101 and RN 106 are aligned. Each TTI has three portions. First, A DL channel, such as DL channel 1911 of ABS 101 (comprised of DL control channel 1911A and DL data channel 1911B) or DL control channel 1914 of RN 106, during which the ABS 101 or RN 106 transmits a DL burst to their respective UEs. Second, a UL channel, such as UL control channel 1912 of ABS 101 or UL channel 1915 of RN 106 (comprised of UL data channel 1915A and UL control channel 1915B), during which the ABS 101 or RN 106 receive UL bursts from their respective UEs. Between the DL channels 1911 and the UL channel 1912, and between the DL channel 1914 and the UL channels 1915, there is a guard interval 1913 for DL-UL transmission switching. It is understood that the DL control channels 1911A and 1914 may represent a PDCCH, the DL data channel 1911B may represent a PDSCH, the UL data channel 1915A may represent a PUSCH, and the UL control channels 1912 and 1915B may represent a PUCCH.

The portion of the TTI devoted to the DL channel and the UL channel of each of ABS 101 and RN 106 may vary in each TTI. For example, in this embodiment, ABS 101 has a long DL and a short UL in TTI n 1901. But in TTI n+1, ABS 101 changes its TTI partition to a short DL channel and a long UL channel. The ABS 101 and RN 106 do not need to have the same partitioning between DL and UL channels in any given TTI. For example, the DL and UL partitions used by the ABS 101 and RN 106 in FIG. 19 are different. In TTI n 1901, ABS 101 has a long DL channel and a short UL channel while the RN 106 has a short DL channel and a long UL channel.

In this embodiment, the DL control channels 1911A and 1914 of the ABS 101 and RN 106 are aligned in time such that there is no cross-link interference between these channels. Similarly, the UL control channels 1912 and 1915B of the ABS 101 and RN 106 are aligned in time such that there is no cross-link interference. In this case, only the DL data channel 1911B and UL data channel 1915A are impacted by the cross-link interference, in channels 1917.

In some embodiments, cross-link interference may result, for example, from uncoordinated TDD configurations between neighboring cells even though the TDD configurations per cell may not change dynamically (i.e. on a slot or subframe basis), and from dynamic DL and UL resource allocation of a UL spectrum in a flexible duplex operation. Cross-link interference may also result from an in-band full duplex base station transmitting signals to a UE and receiving signals from another UE on the same set of time-frequency resources. In such a case, the cross-link interference is between the two UEs. For generality, the term dynamic interference shall be used to refer to cross-link interference from dynamic TDD, uncoordinated TDD, full-duplex BS operation, dynamic flexible duplex, and residual self-interference due to full duplex operation.

In some embodiments, a UE applies a first transmission format to subframe or channel resources that are not suffering from dynamic interference, and the UE applies a second transmission format to subframe or channel resources that are suffering from dynamic interference. A transmission format may include, for example, DL transmit power, DL data channel modulation and coding scheme (MCS), DL transmission schemes, DL transmission rank, DL transmission beams, or OFDM numerology (e.g., subcarrier spacing, symbol duration, cyclic prefix, RB size, etc.). The second transmission format may be adapted from the first transmission format based on dynamically occurring cross-link interference in order to mitigate the interference. This adaptation may include, for example, lowering MCS index values, lowering a transmission rank of the transmission format, changing the OFDM numerology, or adjusting a spatial multiplexing scheme. In some embodiments, a serving base station indicates how to adjust the transmission format of the UE to account for cross-link interference. The BS may determine the adjustments based on feedback from the UE, such as a CSI measurement.

Figure 20:
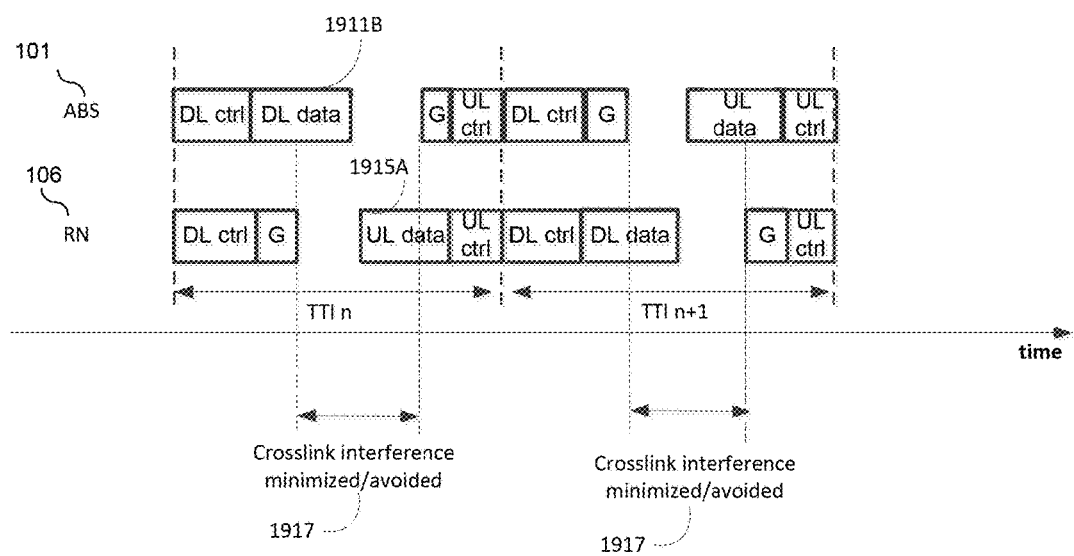
FIG. 20 illustrates an example timing diagram, according to this disclosure, depicting a frame structure of the ABS and the RN, including DL and UL data transmissions to UEs, where dynamic cross-link interference is present, but a transmission format has been adapted to mitigate the interference.

FIG. 20 illustrates an example timing diagram, according to this disclosure, depicting a frame structure of the ABS 101 and the RN 106, including DL and UL data transmissions to UEs, such as UEs 104 or 108, where dynamic cross-link interference is present but a transmission format has been adapted to mitigate the interference. In this embodiment, transmissions to and from the ABS 101 and the RN 106, with reference to a UE such as UE 104, are shown, although the UE 104 is not shown. The transmissions shown may not be intended transmissions to and from the UE 104, but are understood to be received or transmitted by the UE 104. That is, some of the transmissions may be unintentionally overheard.

In this embodiment, the transmission format has been adapted so that the DL data channel 1911B of the ABS 101 and the UL data channel 1915A of the RN 106 no longer overlap, resulting in a reduction or elimination of potential cross-link interference. This may be accomplished by, for example, adjusting the OFDM numerology of the UE 104, which could include one or more of changing the duration of the OFDM symbols, adjusting the subcarrier spacing, or changing the cyclic prefix length.

For example, in an embodiment where the reference or nominal subcarrier spacing of OFDM symbols for the DL data channel 1911B is Al (where Al is a positive number), the adjusted subcarrier spacing for the DL data channel 1911B in slots or subframes with dynamic interference (such as TTI n) is B1 (where B1 is a positive number>A1). Likewise for the UL, the transmission format adjustment for dynamic interference may correspond to the subcarrier spacing of OFDM symbols assumed for UL data channel 1915A. Assuming a reference or nominal subcarrier spacing for the UL data channel 1915A is A2 (where A2 is a positive number), the adjusted subcarrier spacing for the UL data channel 1915A in slots or subframes with dynamic interference (such as TTI n) is A2-B2 (where B2 is a positive number>A2). In one example, A1/A2 is 15 kHz, B1/B2 is 30 kHz. In another example, A1/A2 is 60 kHz, B1/B2 is 120 kHz.

If the DL data channel 1911B starts from the beginning (or near the beginning, such as after the DL control channel 1911A) of the slot or subframe (e.g., TTI n) and the UL data channel 1915A ends at the end (or near the end) of the slot or subframe. Applying larger subcarrier spacing for the DL data channel 1911B and the UL data channel 1915A while keeping the same number of OFDM symbols reduces or eliminates cross-link interference between the DL data channel 1911B and the UL data channel 1915A (or residual self-interference for full duplex operation) since the overlapping DL data channel 1911B and the UL data channel 1915A durations are reduced.

The control signaling used by the ABS 101 or the RN 106 to indicate to the UE a DL data channel 1911B or a UL data channel 1915A with larger subcarrier spacing can be performed, for example, using control signaling such as a DCI. The transmission format adjustment can be applied to either DL data channel 1911B, UL data channel 1915A, or both in the same subframe or slot (e.g., TTI n). The control signaling can be higher layer signaling, or dynamic signaling.

In some embodiments, upon receiving control signaling over the resource with potential dynamic interference, the UE performs channel sensing to determine the presence of cross-link interference (e.g. by detecting the interference or energy level). For DL channels, if cross-link interference or dynamic interference is determined to be present, the UE may apply the transmission format adjustment for receiving the corresponding DL resources (where applicable transmission format adjustments are as described above). Other possible UE behavior includes discarding received DL channel data if an amount of interference is determined to be above a certain threshold. Multiple interference thresholds may be predefined or configured, each corresponding to a different UE behavior when the threshold is exceeded. For example, a first threshold may correspond to a first transmission format adjustment, a second threshold may correspond to a second transmission format adjustment, and a third threshold may correspond to discarding received DL channel data. The UE may be informed to perform such sensing by the ABS 101 or RN 106 when those devices are aware that dynamic interference may occur.

Likewise for UL data channels, if cross-link interference or dynamic interference is determined to be present, the UE may apply the transmission format adjustment for transmitting the corresponding UL resources (where applicable transmission format adjustments are as described above). Similar to the DL behavior, other possible UE behavior includes refraining from transmitting UL channel data if the interference is determined to be above a certain threshold. Multiple interference thresholds may be predefined or configured, each corresponding to different UE behavior. For example, a first threshold may correspond to a first transmission format adjustment, a second threshold may correspond to a second transmission format adjustment and a third threshold may correspond to refraining from transmitting UL channel data. The UE may be informed to perform such sensing by the ABS 101 or RN 106 when those devices are aware that dynamic interference may occur.

Figure 21:
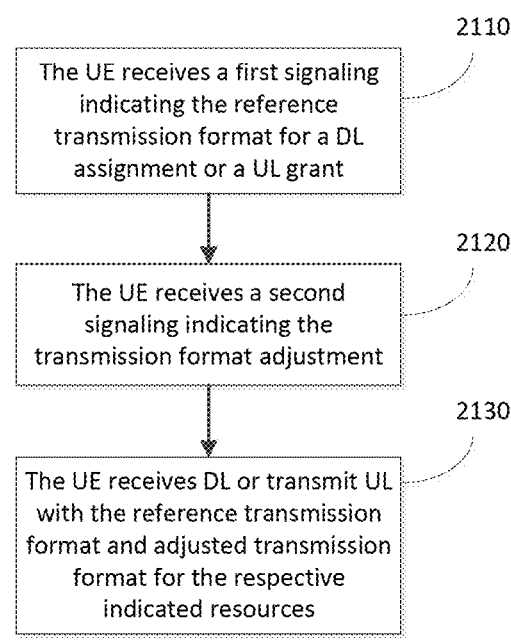
FIG. 21 illustrates an example process for signaling a UE to adjust transmission format to mitigate dynamic interference according to this disclosure.

FIG. 21 illustrates an example process for signaling a UE to adjust transmission format to mitigate dynamic interference according to this disclosure. The UE may be, for example, a UE 104 or 108. The UE may receive the signals discussed in FIG. 21 from a serving base station such as ABS 101 or RN 106.

At step 2110, the UE receives a first (or reference) transmission format signaled in a DCI for DL assignment, and the UE applies the first transmission format to a first set of channel resources corresponding to the DL assignment.

At step 2120, the UE receives second signaling in the same DCI for a second set of resources within the first set of resources, including an adjustment to the transmission format for the second set of resources. The first and second resources may be, for example, frequency resources (a set of RBs, PRBs, sub-RBs, or sub-PRBs), time resources (a set of slots, subframes, or OFDM symbols) or combination of time and frequency resources. In some embodiments, rather than indicating an adjustment to the first transmission format, the second signaling may simply indicate a second transmission format directly. The UE applies the adjustments to the first transmission format (or applies the second transmission format directly) to the second set of channel resources.

At step 2130, the UE receives DL data or transmits UL data using the first transmission format and the adjusted second transmission format for the corresponding sets of channel resources. For example, the first transmission format may be used for a subset of the first set of channel resources that excludes the second set of channel resources, while the adjusted second transmission format is used for the second set of channel resources.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A relay node (RN) comprising:
   a transceiver configured to receive, from a second node, a synchronization signal burst comprising a plurality of synchronization signal blocks, each of the plurality of synchronization signal blocks transmitted using a set of channel resources; and
   a processor operably connected to the transceiver, the processor configured to:
      measure the received plurality of synchronization signal blocks;
      identify, based at least in part on measurement of the plurality of synchronization signal blocks, at least one of the plurality of synchronization signal blocks to monitor as a synchronization reference for the second node; and
      select a set of channel resources for use to transmit an RN synchronization signal to at least one third node, the selected set of channel resources comprising at least one other synchronization signal block from the synchronization signal burst.

2. The RN of claim 1, wherein:
   the transceiver is configured to:
      transmit, to the second node, an indication of the at least one of the plurality of synchronization signal blocks that the RN has determined to monitor as a synchronization reference; and
      receive, from the second node, a candidate set of channel resources for use by the RN to transmit the RN synchronization signal to the at least one third node, the candidate set of channel resources comprising the at least one other synchronization signal block from the synchronization signal burst;
   the processor is configured to select the set of channel resources from the candidate set of channel resources for use to transmit the RN synchronization signal and
   the transceiver is further configured to-transmit, to the second node, an indication of the selected set of channel resources for use to transmit the RN synchronization signal to the at least one third node.

3. The RN of claim 1, wherein:
the transceiver is configured to:
- transmit, to the second node, an indication of the at least one of the plurality of synchronization signal blocks that the RN has identified to monitor as a synchronization reference; and
- receive, from the second node, an indication of the set of channel resources for use by the RN to transmit an RN synchronization signal to at least one third node, the set of channel resources comprising the at least one other synchronization signal block from the synchronization signal burst, the at least one other synchronization signal block different from the at least one of the plurality of synchronization signal blocks that the RN has identified to monitor as a synchronization reference.

4. The RN of claim 1, wherein:
the processor is configured to configure a first periodicity of transmission of an RN synchronization burst such that the first periodicity of transmission of the RN synchronization burst is longer than a second periodicity of transmission of the received synchronization signal burst;
the transceiver is configured to receive, from the second node, a second synchronization signal burst comprising a second plurality of synchronization signal blocks; and
the processor is further configured to:
- measure the received second plurality of synchronization signal blocks; and
- identify, based at least in part on measurement of the second plurality of synchronization signal blocks, at least one of the second plurality of synchronization signal blocks to monitor as an updated synchronization reference for the second node.

5. The RN of claim 4, wherein the transceiver is configured to transmit, to the at least one third node, an indication that the RN will not transmit an RN synchronization signal to the at least one third node while receiving the second synchronization signal burst.

6. The RN of claim 1, wherein the transceiver is configured to transmit, to the second node, a request for the second node not to transmit to the RN using a protected set of channel resources.

7. The RN of claim 1, wherein the transceiver is configured to transmit, to the second node, a request for the second node not to request a transmission from the RN using a protected set of channel resources.

8. The RN of claim 1, wherein:
the transceiver is configured to receive, from the second node, when interference is detected on a downlink channel to the at least one third node, an adjustment to a transmission format of the downlink channel, the adjustment to the transmission format comprising an adjustment of at least one of orthogonal frequency division multiplexing (OFDM) subcarrier spacing, OFDM symbol duration, or OFDM cyclic prefix length.

9. The RN of claim 8, wherein the adjustment to the transmission format comprises an increase of the subcarrier spacing of the downlink channel.

10. The RN of claim 1, wherein the second node comprises one of an anchor base station (ABS) or a second relay node (RN).

11. An anchor base station (ABS) comprising:
a processor; and
a transceiver operably connected to the processor, the transceiver configured to transmit, to a relay node (RN), a synchronization signal burst comprising a plurality of synchronization signal blocks, each of the plurality of synchronization signal blocks transmitted using a set of channel resources, such that the RN is able to identify at least one of the plurality of synchronization signal blocks to monitor as a synchronization reference for the ABS and such that the RN is able to select a set of channel resources for use to transmit an RN synchronization signal to at least one user equipment (UE), the selected set of channel resources comprising at least one other synchronization signal block from the synchronization signal burst.

12. The ABS of claim 11, wherein the transceiver is configured to:
- receive, from the RN, an indication of at least one of the plurality of synchronization signal blocks that the RN is monitoring as a synchronization reference for the ABS;
- transmit, to the RN, a candidate set of channel resources for use by the RN to transmit the RN synchronization signal to the at least one user equipment (UE), the candidate set of channel resources comprising the at least one other synchronization signal block from the synchronization signal burst; and
- receive, from the RN, an indication of the selected set of channel resources from the candidate set of channel resources.

13. The ABS of claim 11, wherein:
the transceiver is configured to receive, from the RN, an indication of at least one synchronization signal block that the RN is using as a synchronization reference for the ABS;
the processor is configured to identify the set of channel resources for use by the RN to transmit the RN synchronization signal to the at least one user equipment (UE), the set of channel resources comprising the at least one other synchronization signal block that is different from the at least one of the synchronization signal blocks that the RN is using as a synchronization reference for the ABS; and
the transceiver is further configured to transmit, to the RN, an indication of the identified set of channel resources for selection for use by the RN to transmit the RN synchronization signal to the at least one UE.

14. The ABS of claim 11, wherein:
the transceiver is configured to transmit, to the RN, a second synchronization signal burst comprising a second plurality of synchronization signal blocks, such that the RN is able to identify at least one other synchronization signal block of the second plurality of synchronization signal blocks to monitor as an updated synchronization reference for the ABS.

15. The ABS of claim 11, wherein:
the transceiver is configured to receive, from the RN, a request for the ABS not to transmit to the RN using a protected set of channel resources.

16. The ABS of claim 11, wherein:
the transceiver is configured to receive, from the RN, a request for the ABS not to request a transmission from the RN using a protected set of channel resources.

17. The ABS of claim 11, wherein the transceiver is configured to transmit, to the RN, when interference is detected on a downlink channel to the at least one user equipment (UE), an adjustment to a transmission format of the downlink channel, the adjustment to the transmission format comprising an adjustment of at least one of orthogonal frequency division multiplexing (OFDM) subcarrier spacing, OFDM symbol duration, or OFDM cyclic prefix length.

18. The ABS of claim 17, wherein the adjustment to the transmission format comprises an increase of the subcarrier spacing of the downlink channel.

19. The ABS of claim 11, wherein the channel resources comprise at least one of time resources, frequency resources, or spatial resources.

* * * * *